(12) United States Patent
Sugita

(10) Patent No.: US 9,535,845 B2
(45) Date of Patent: Jan. 3, 2017

(54) CACHE CONTROL DEVICE AND CACHE CONTROL METHOD

(71) Applicant: Renesas Electronics Corporation, Kawasaki-shi (JP)

(72) Inventor: Yasuhiro Sugita, Kawasaki (JP)

(73) Assignee: RENESAS ELECTRONICS CORPORATION, Kawasaki-Shi Kanagawa (JP)

( * ) Notice: Subject to any disclaimer, the term of this patent is extended or adjusted under 35 U.S.C. 154(b) by 160 days.

(21) Appl. No.: 14/052,616

(22) Filed: Oct. 11, 2013

(65) Prior Publication Data

US 2014/0115262 A1    Apr. 24, 2014

(30) Foreign Application Priority Data

Oct. 19, 2012    (JP) .................................. 2012-231831

(51) Int. Cl.
| G06F 12/12 | (2016.01) |
| G06F 12/08 | (2016.01) |
| G06F 9/50 | (2006.01) |

(52) U.S. Cl.
CPC ......... *G06F 12/0871* (2013.01); *G06F 9/5016* (2013.01); *G06F 12/08* (2013.01); *G06F 12/12* (2013.01); *G06F 12/122* (2013.01)

(58) Field of Classification Search
CPC ...... G06F 12/0871; G06F 12/08; G06F 12/12; G06F 12/122
See application file for complete search history.

(56) References Cited

U.S. PATENT DOCUMENTS

| 6,763,327 | B1 * | 7/2004 | Songer ................ G06F 9/45504 703/20 |
| 7,000,072 | B1 | 2/2006 | Aisaka et al. |
| 7,246,202 | B2 | 7/2007 | Morishita et al. |
| 2004/0162953 | A1 * | 8/2004 | Yoshida ................ G06F 3/0613 711/153 |
| 2008/0034236 | A1 * | 2/2008 | Takayama et al. ........... 713/322 |
| 2008/0059712 | A1 * | 3/2008 | Fedorova ...................... 711/130 |
| 2009/0083508 | A1 | 3/2009 | Otero Perez et al. |
| 2010/0023700 | A1 * | 1/2010 | Chen et al. .................... 711/135 |

(Continued)

FOREIGN PATENT DOCUMENTS

| JP | H07-248967 A | 9/1995 |
| JP | 2001-109661 A | 4/2001 |

(Continued)

OTHER PUBLICATIONS

Japanese Office Action dated Jun. 7, 2016 with an English translation.

*Primary Examiner* — Henry Tsai
*Assistant Examiner* — John Roche
(74) *Attorney, Agent, or Firm* — McGinn IP Law Group, PLLC

(57) ABSTRACT

A cache control device includes an area determination unit that determines an area of a cache memory which is allocated to each instruction flow on the basis of an allocation ratio of an execution time per unit time, which is allocated to each of a plurality of the instruction flows by a CPU. The area determination unit specifies the area allocated to the specified instruction flow in response to an access request from a memory access unit, and accesses the specified area in the cache memory.

23 Claims, 27 Drawing Sheets

(56) References Cited

U.S. PATENT DOCUMENTS

| | | |
|---|---|---|
| 2010/0082945 A1 | 4/2010 | Adachi et al. |
| 2011/0161586 A1* | 6/2011 | Potkonjak ............ G06F 12/084 711/122 |
| 2011/0239220 A1 | 9/2011 | Gibson et al. |
| 2013/0311727 A1* | 11/2013 | Yamauchi et al. ............ 711/149 |

FOREIGN PATENT DOCUMENTS

| | | |
|---|---|---|
| JP | 2004-178571 A | 6/2004 |
| JP | 2005-071046 A | 3/2005 |
| JP | 2008-520023 A | 6/2008 |
| JP | 2010-086128 A | 4/2010 |

* cited by examiner

BIT CONFIGURATION EXAMPLE OF LOGICAL ADDRESS

FIG. 10

BIT CONFIGURATION EXAMPLE OF LOGICAL ADDRESS

BIT CONFIGURATION EXAMPLE OF LOGIC ADDRESS

CACHE CONTROL DEVICE AND CACHE CONTROL METHOD

CROSS-REFERENCE TO RELATED APPLICATIONS

The disclosure of Japanese Patent Application No. 2012-231831 filed on Oct. 19, 2012 including the specification, drawings and abstract is incorporated herein by reference in its entirety.

BACKGROUND

The present invention relates to a cache control device and a cache control method, and for example, a cache control device and a cache control method, which divide an area of a cache memory.

Parallel processing of a multiprocessor or a multithread, or a cache of instructions or data is suited for a solution to performance degradation attributable to a speed difference between a processor and a memory. Also, in the parallel processing under a real-time control, a property that a fluctuation of a processing time caused by an inter-task interference is reduced, and specific processing can be completed within a given real time is required.

Japanese Unexamined Patent Application Publication No. 2010-86128 discloses a technique related to a multithread processor for enabling a hardware thread to be flexibly selected while ensuring a minimum execution time of the hardware thread. A thread scheduler provided in the multithread processor disclosed in Japanese Unexamined Patent Application Publication No. 2010-86128 designates the execution of at least one hardware thread fixedly selected in a predetermined first execution time, and designates the execution of an arbitrary hardware thread in a second execution time.

In this example, in the processor having the cache, there occurs a variation in cache hit ratio caused by such an interference that a cache area for one task is overwritten for another task. Under the circumstances, Japanese Unexamined Patent Application Publication No. 2004-178571 discloses a technique in which the area of the cache memory is divided, and allocated to a plurality of tasks, individually. A cache control device disclosed in Japanese Unexamined Patent Application Publication No. 2004-178571 includes an area management unit that manages the respective tasks which are processed in parallel by a microprocessor, in association with the respective areas into which the memory area of the cache memory is divided. That is, in Japanese Unexamined Patent Application Publication No. 2004-178571, the cache memory areas that can be operated by the respective tasks are restricted to solve the interference between the tasks. Also, Japanese Unexamined Patent Application Publication Nos. Hei-07 (1995)-248967, 2005-071046, and 2001-109661 disclose a technique in which a capacity of the cache memory is allocated on the basis of a priority of the tasks (or processes).

SUMMARY

However, Japanese Unexamined Patent Application Publication Nos. 2004-178571, Hei-07 (1995)-248967, 2005-071046, and 2001-109661 suffer from such a problem that usability of the overall cache memory may be degraded in the parallel processing in the real-time control. Japanese Unexamined Patent Application Publication No. 2010-86128 does not disclose a technique for improving the usability of the cache memory.

The other problems and novel features will become apparent from the description of the present invention and the attached drawings.

According to one aspect, a cache control device includes an area determination unit that determines an area of a cache memory which is allocated to each instruction flow on the basis of an allocation ratio of an execution time per unit time, which is allocated to each of a plurality of the instruction flows by a processor.

Also, according to another aspect, there is provided an area determination unit that determines an area of a cache memory which is allocated to each instruction flow on the basis of a ratio of a processing speed among a plurality of processors to which a plurality of instruction flows is dispersedly allocated.

Further, according to still another aspect, there is provided a cache control method which receives an allocation ratio of an execution time per unit time, which is allocated to each of a plurality of instruction flows by a processor, and determines an area of a cache memory which is allocated to each of the instruction flows on the basis of the allocation ratio of the execution time.

According to the above-mentioned one aspect, the usability of the overall cache memory can be improved in the parallel processing in the real-time control.

BRIEF DESCRIPTION OF THE DRAWINGS

FIG. 10 is a diagram illustrating an example of slot allocation information, allocation slot number information, and an index table according to the second embodiment;

DETAILED DESCRIPTION

Hereinafter, specific embodiments according to the above-mentioned aspects will be described in detail with reference to the accompanying drawings. In the respective drawings, the same elements are denoted by identical symbols, and a repetitive description will be omitted as occasion demands for clarification of the description.

First Embodiment

Figure 27:
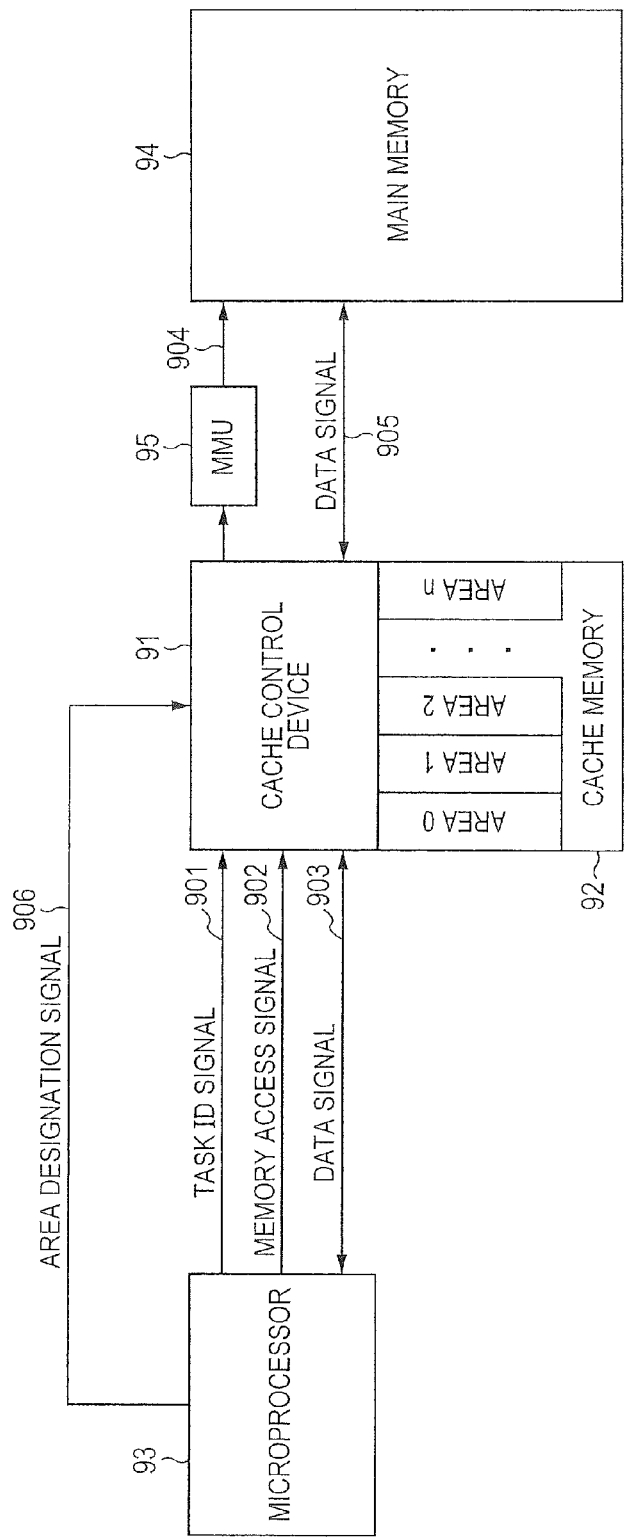
FIG. 27 is a block diagram illustrating a configuration of a computer system including a cache control device in a related art.

FIG. 27 is a block diagram illustrating a configuration of a computer system including a cache control device in Japanese Unexamined Patent Application Publication No. 2004-178571. FIG. 27 typically illustrates a cache control device 91, a cache memory 92, a microprocessor 93, a main memory 94, and an MMU (memory management unit) 95 in the computer system. The cache control device 91 is connected to the microprocessor 93, the cache memory 92, and the main memory 94. Also, the cache control device 91 is connected to the main memory 94 through the MMU 95.

The microprocessor 93 conducts a multitasking process on a plurality of programs as a task. Upon changing a task to be processed, the microprocessor 93 notifies the cache control device 91 of a task ID for identifying the task to be currently processed through a task ID signal line 901. In this example, the task ID is obtained by converting a logical address indicative of a main memory address at which a program to be processed as the task is stored. For example, the task ID is an address of the program.

Also, the microprocessor 93 notifies the cache control device 91 of an access address through a memory access signal line 902 in the access processing to the cache memory 92 in each task. In this example, the access address is a logical address indicative of an address within the main memory 94 of data to be subjected to an access request. The microprocessor 93 transmits or receives data to be read or written with respect to the cache control device 91 through a data signal line 903.

Further, the microprocessor 93 notifies the cache control device 91 of area designation information through an area designation signal line 906. In this example, the area designation information represents information for designating a cache memory size to be allocated to the respective tasks, for each of the plural tasks.

The cache memory 92 is a storage medium that can be data-accessed from the main memory 94 at a high speed, which is, for example, an SRAM (static random access memory). The MMU 95 converts a logical address transmitted from the cache control device 91 through a memory access signal line 904, into a physical address. The main memory 94 is a storage medium which is lower in access speed than the cache memory 92, which is, for example, a DRAM (dynamic random access memory).

The cache control device 91 is a device for controlling the data access to the cache memory 92. The cache control device 91 divides a memory area of the cache memory 92 according to the area designation information received from the microprocessor 93, and manages the divided memory areas in association with the respective tasks. The cache control device 91 accesses the cache memory 92 on the basis of the task ID and the access address. Also, the cache control device 91 appropriately notifies the main memory 94 of the access address through the memory access signal line 904 according to a determination result of hit or miss of an access request, and transmits or receives data with respect to the main memory 94 through a data signal line 905.

Figure 28:
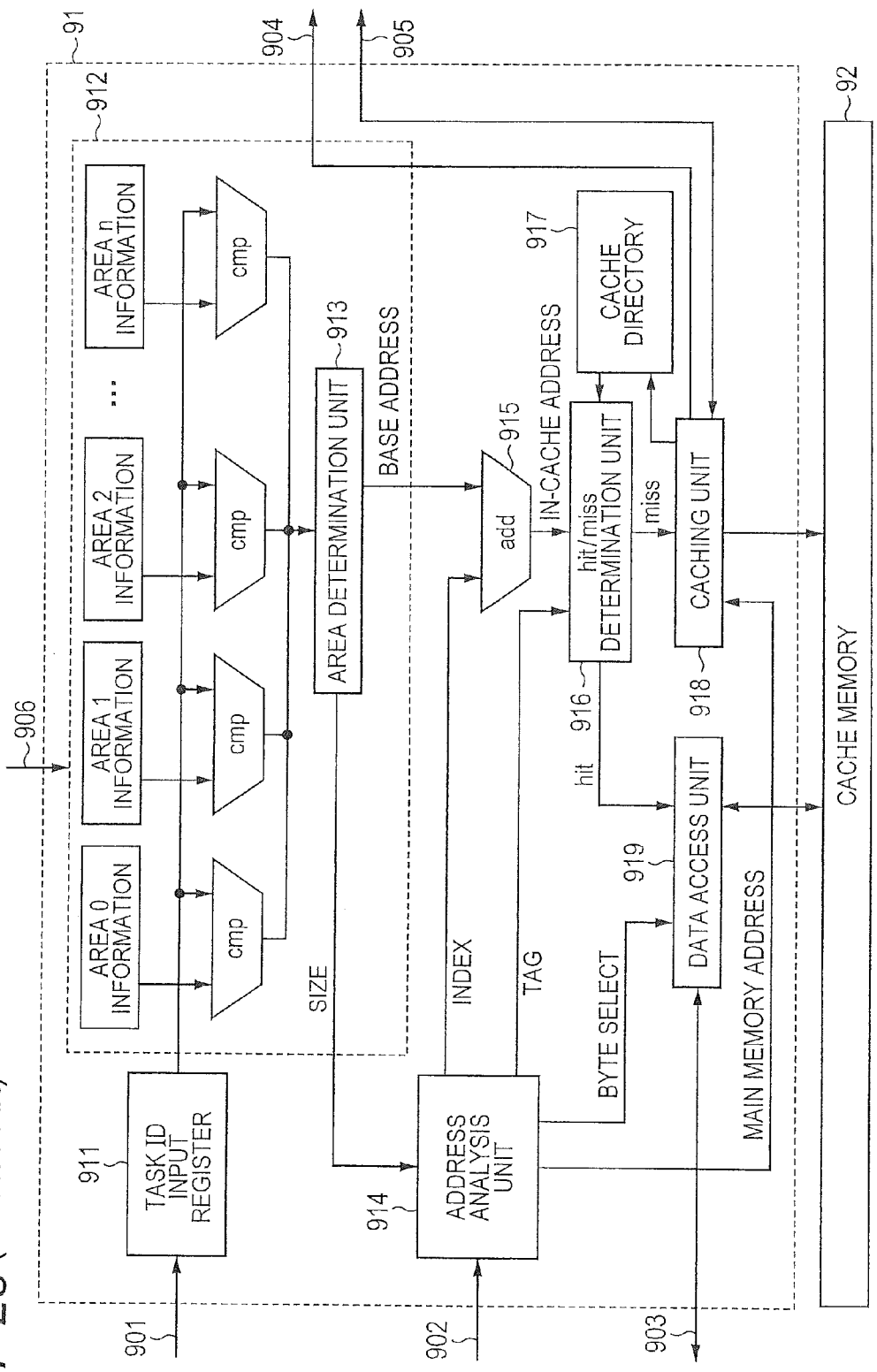
FIG. 28 is a block diagram illustrating a configuration of a cache control device in the related art.

FIG. 28 is a block diagram illustrating a configuration of a cache control device in Japanese Unexamined Patent Application Publication No. 2004-178571. The cache control device 91 includes a task ID input register 911, an area management unit 912, an address analysis unit 914, an in-cache address generation unit 915, a hit/miss determination unit 916, a cache directory 917, a caching unit 918, and a data access unit 919. Also, the area management unit 912 includes an area determination unit 913. In this example, the area management unit 912 and the area determination unit 913 pertinent to this embodiment will be mainly described, and the other configurations will be omitted from the description.

The area management unit 912 divides the memory area of the cache memory 92 on the basis of the area designation information transmitted from the microprocessor 93 through the area designation signal line 906, and manages area numbers for identifying the respective areas in association with the task IDs. In this situation, the area determination unit 913 generates an area management table on the basis of the area designation information, and holds the area management table. In this example, the area management table is a table pairing the area numbers with base addresses and sizes.

In this way, the technique disclosed in Japanese Unexamined Patent Application Publication No. 2004-178571 merely allocates the areas with the use of the cache memory size per se to be allocated to the respective tasks designated by the area designation information. Also, the above area designation information is fixedly set in advance. That is, in Japanese Unexamined Patent Application Publication No. 2004-178571, in order to allocate the area of the cache memory to a certain task preferentially as compared with the other tasks, there is a need to fix and set the area designation information in advance.

In this example, as described above, in the parallel processing in the real-time control, because the priority of the respective tasks is dynamically changed, it is difficult to deal with a setting change in the fixed area setting of the cache memory as in Japanese Unexamined Patent Application Publication No. 2004-178571. Also, in the real-time control, there is required a property that the specific processing can be completed within a predetermined real time for each of the tasks. However, in the related arts disclosed in Japanese Unexamined Patent Application Publication Nos. Hei-07 (1995)-248967, 2005-071046, and 2001-109661, the allocation of the area to the task lower in the priority is postponed. For that reason, the area of the cache memory is insufficiently allocated to the task low in the priority, and there is no guarantee that the specific processing can be completed within the given real time. Hence, those related arts suffer from such a problem that the usability of the overall cache memory may be resultantly degraded.

Under the circumstances, the cache control device according to the first embodiment includes an area determination unit that determines an area of a cache memory which is allocated to each instruction flow on the basis of an allocation ratio of an execution time per unit time, which is allocated to each of a plurality of the instruction flows by a processor. That is, the allocation ratio of the actual execution time in the processor of the respective instruction flows in the real-time processing is balanced with the use rate of the cache memory. As a result, the utilization ratio of the resource in each of the instruction flows can be more precisely set.

Figure 1:
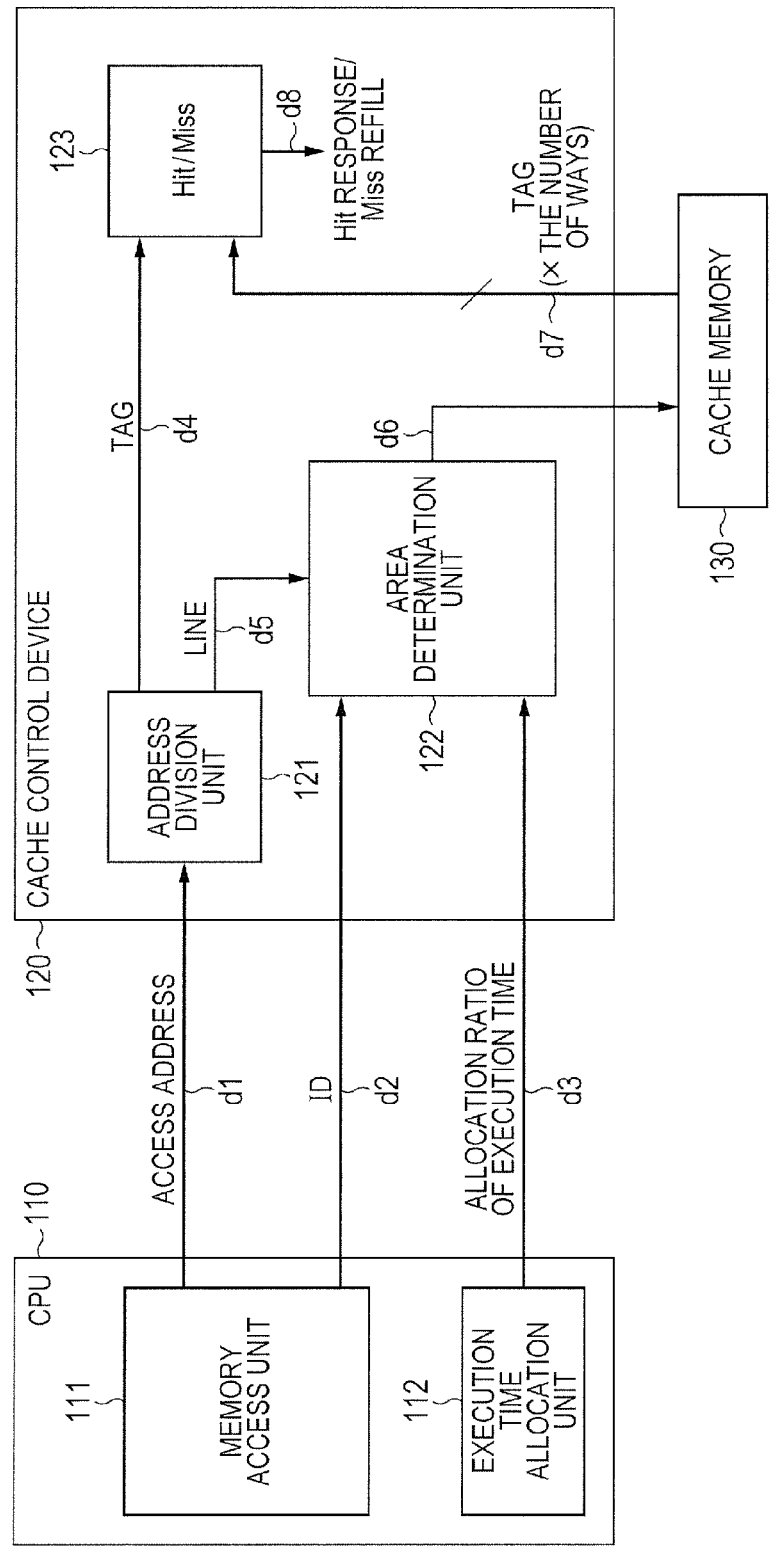
FIG. 1 is a block diagram illustrating a configuration of a computer system including a cache control device according to a first embodiment.

FIG. 1 is a block diagram illustrating a configuration of a computer system including a cache control device according to the first embodiment. FIG. 1 typically illustrates a CPU (central processing unit) 110, a cache control device 120, and a cache memory 130 in the computer system. The cache control device 120 is connected to the CPU 110, the cache memory 130, and a main memory (not shown).

The CPU 110 conducts a multitasking process on a plurality of programs as a task. The CPU 110 includes a memory access unit 111 and an execution time allocation unit 112. The memory access unit 111 notifies the cache control device 120 of an access address d1 and IDd2 of the task in an access process to the cache memory in each of the tasks. In this example, the access address d1 is a logical address indicative of an address within the main memory to be subjected to an access request. IDd2 is identification information on the task.

The memory access unit 111 is called "load store unit". Also, the cache memory 130 may be any one of a data cache and an instruction cache.

The execution time allocation unit 112 allocates an execution time for executing each of the plurality of tasks to be processed in parallel by the CPU 110, within the CPU 110. That is, the scheduler of, for example, Japanese Unexamined Patent Application Publication No. 2010-86128 can be used in the execution time allocation unit 112.

The scheduler of Japanese Unexamined Patent Application Publication No. 2010-86128 flexibly allocates a plurality of hardware threads to a plurality of time slots. In this example, it is assumed that the time slot is a time interval obtained by evenly dividing a given time by a given number. Also, the hardware thread represents a system that generates the instruction flow configured by a sequence of instruction groups read from an instruction memory according to an instruction fetch address output by a thread program counter incorporated into the CPU 110. That is, the instructions included in the instruction flow generated by one hardware thread are instructions highly relevant to each other. Also, the task is regarded as an instruction flow configured by a plurality of highly relevant instructions.

In this example, each of the tasks ensures the execution time as long as a time corresponding to the number of allocated time slots (the number of allocation time slots) per a given time. Also, each of the tasks is executed at a frequency of the ratio of the number of allocation time slots to a total number of time slots in the same CPU 110, that is, the same clock frequency. That is, each of the tasks is executed at a processing speed corresponding to the number of allocation time slots by the CPU 110. For that reason, in this example, the ratio of the time slots allocated to each of the tasks can be regarded as the ratio of the processing speed.

Then, the execution time allocation unit 112 notifies the cache control device 120 of an allocation ratio d3 of the execution time. The allocation ratio d3 of the execution time is information representing occupancy of the execution time allocated to the respective tasks. For example, the allocation ratio d3 of the execution time may be calculated every time the execution time is allocated by the execution time allocation unit 112. Alternatively, the execution time allocation unit 112 may notify the cache control device 120 of the execution time per se allocated to each of the tasks, and the cache control device 120 may calculate the allocation ratio d3 of the execution time for each of the tasks according to the ratio of the respective execution times. Alternatively, an area determination unit 122 may read the allocation ratio d3 of the execution time from the execution time allocation unit 112. That is, the area determination unit 122 acquires the allocation ratio d3 of the execution time from at least the execution time allocation unit 112.

The cache control device 120 determines whether or not data corresponding to the access address d1 designated by an access request from the CPU 110 has been stored in the cache memory 130. Then, if the data has been stored in the cache memory 130, the cache control device 120 outputs the data read from the cache memory 130 to the CPU 110. On the other hand, if the data has not been stored in the cache memory 130, the cache control device 120 conducts an access request to the main memory.

The cache control device 120 includes an address division unit 121, the area determination unit 122, and a hit/miss determination unit 123. The address division unit 121 divides the access address d1 received from the memory access unit 111 into at least a tag d4 and a line d5. The address division unit 121 may further divide the line d5 into a plurality of areas. Also, the memory access unit 111 may have a configuration corresponding to the address division unit 121. In this case, the cache control device 120 does not require the address division unit 121, and receives the tag d4 and the line d5 from the memory access unit 111.

The area determination unit 122 determines the allocation of the area of the cache memory 130 to each of the tasks on the basis of the allocation ratio d3 of the execution time notified from the execution time allocation unit 112. That is, a larger area is allocated to the task high in the allocation ratio of the execution time whereas a relatively small area is allocated to the task low in the allocation ratio of the execution time. As a result, the execution time during which the respective instruction flows are actually processed by the CPU 110 can be balanced with the area of the cache memory 130, which is allocated to the respective instruction flows.

Also, the area determination unit 122 conducts a cache access d6 to the cache memory 130 according to the ID d2 and line d5. Then, the hit/miss determination unit 123 receives a tag d7 as a response to the above access from the cache memory 130. Then, the hit/miss determination unit 123 compares the tag d7 with the tag d4 included in the access address d1 notified from the memory access unit 111. The hit/miss determination unit 123 conducts a hit response or a miss refill d8 according to the comparison result.

Figure 2:
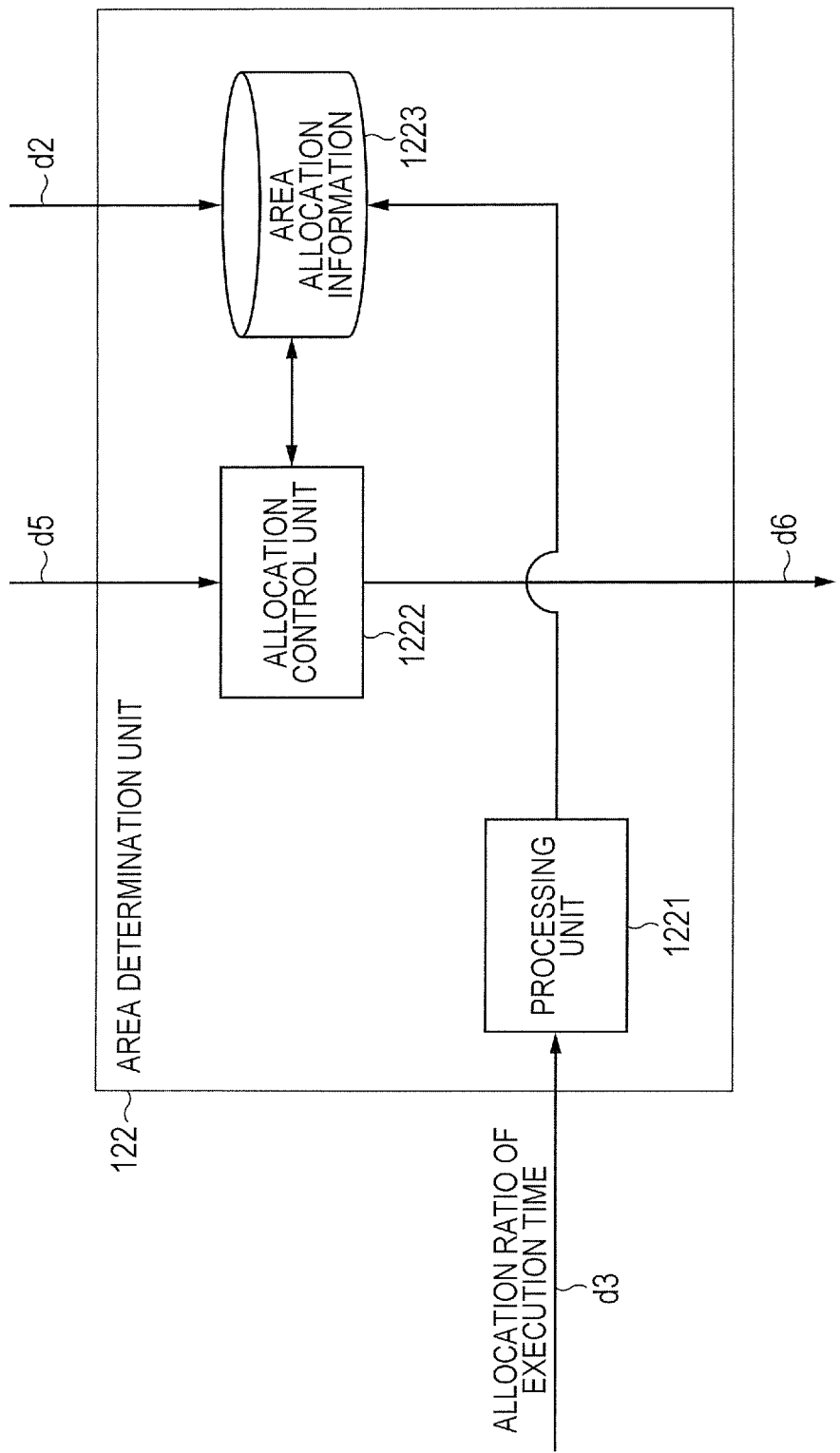
FIG. 2 is a block diagram illustrating a configuration of an area determination unit according to the first embodiment.

FIG. 2 is a block diagram illustrating a configuration of the area determination unit 122 according to the first embodiment. The area determination unit 122 includes a processing unit 1221, an allocation control unit 1222, and area allocation information 1223. The processing unit 1221 receives the allocation ratio d3 of the execution time, processes the allocation ratio d3 of the execution time, and generates the area allocation information to be allocated to each of the tasks. For example, the processing unit 1221 specifies the area of the cache memory to be allocated to each of the tasks on the basis of the allocation ratio d3 of the execution time. Then, the processing unit 1221 generates the area allocation information associating the specified areas with the tasks.

Thereafter, the processing unit 1221 stores the storage area as the area allocation information 1223. The area allocation information 1223 associates the areas with the tasks. Also, the allocation control unit 1222 conducts the cache access d6 on the basis of the area to be accessed specified from the area allocation information 1223 according to the ID d2, and the line d5. In this way, in the first embodiment, the area to be accessed can be easily specified at the time of subsequent cache accesses by not the allocation ratio d3 per se of the execution time, but the processed information such as the area allocation information. Also, the instruction flows and the lines can be efficiently associated with each other.

Figure 3:
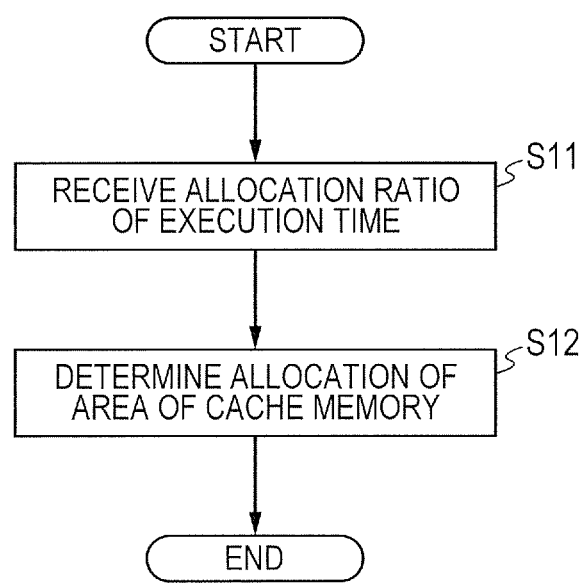
FIG. 3 is a flowchart illustrating a flow of processing in a cache control method according to the first embodiment.

FIG. 3 is a flowchart illustrating a flow of processing in a cache control method according to the first embodiment. First, the area determination unit 122 receives the allocation ratio d3 of the execution time from the execution time allocation unit 112 (S11). Then, the area determination unit 122 determines the allocation of the area of the cache memory 130 on the basis of the allocation ratio d3 of the execution time (S12).

Figure 4:
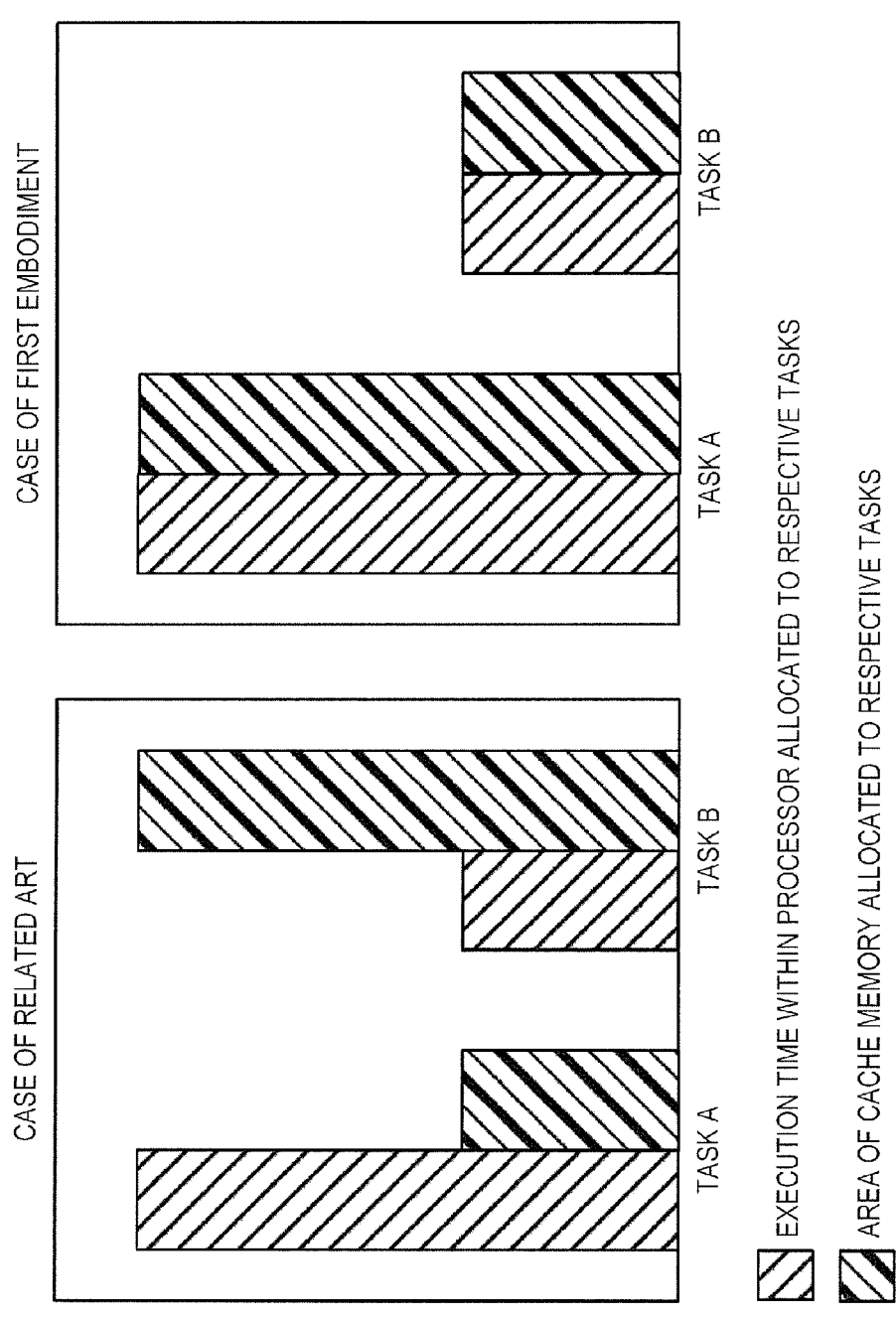
FIG. 4 is a diagram illustrating a problem and advantages.

FIG. 4 is a diagram illustrating a problem and advantages when two tasks are processed in parallel. FIG. 4 schematically illustrates comparison in a relationship of the execution time of the processor and the area of the cache memory which are allocated to each of the tasks between the related art of Japanese Unexamined Patent Application Publication No. 2004-178571 and the first embodiment to be described later.

In this case, for example, in the parallel processing in the real-time control, an allocation ratio of the execution time between a task A and a task B may be dynamically changed due to a scheduler disclosed in the above-mentioned Japanese Unexamined Patent Application Publication No. 2010-86128. For that reason, when the allocation ratio of the area of the cache memory in the task is fixedly set as in Japanese Unexamined Patent Application Publication No. 2004-178571, there is a risk that the allocation ratio of the execution time is unbalanced with the allocation ratio of the area after the allocation ratio of the execution time has been changed. For example, when the task B is higher in the initial allocation ratio of the execution time than the task B, and thereafter the task B becomes lower than the task A, a status shown in a left graph of FIG. 4 may occur.

As disclosed in Japanese Unexamined Patent Application Publication Nos. Hei-07 (1995)-248967, 2005-071046, and 2001-109661, if the cache memory area is merely allocated according to the setting of the priority, there is a risk that the overall area is allocated to the highest priority tasks, and the area is not allocated to the task low in the priority. However, in the parallel processing in the real-time control, even if the priority of the task is low, there is a need to ensure the minimum execution time, and satisfy the limit of the execution end time. For that reason, in the priority setting, in the parallel processing in the real-time control, if the priority of the task A is high, there is a possibility that the allocation of the region to the task B is not ensured, and becomes insufficient.

On the other hand, in the first embodiment, as shown in a right graph of FIG. 4, the allocation ratio of the execution time and the allocation ratio of the area in the task A and the task B can be balanced with each other. Hence, in the task where the allocation of the execution time in the processor is relatively high, the larger area of the cache memory is ensured so that the cache hit ratio can be made high to maintain the execution time of the task. Also, in the task where the allocation of the execution time in the processor is relatively low, because the area of the cache memory is ensured according to the ration, the cache hit ratio of some degree can be maintained. For that reason, in the first embodiment, the usability of the overall cache memory can be resultantly improved to shorten the processing time of all the tasks.

FIG. 1 illustrates an example in which the execution time allocation unit 112 is included in the CPU 110. However, the first embodiment is not limited to this configuration. That is, the execution time allocation unit 112 may be disposed outside of the CPU 110, or incorporated into the cache control device 120.

As described above, in the first embodiment, the area of the cache memory to be used can be adaptively set according to the allocation ratio of the execution time to balance the use ratio of a processing execution unit in each of the tasks with the use ratio of the cache. As a result, the use ratio of the resource of each task in the real-time control system can be precisely set as compared with the related art.

Second Embodiment

A second embodiment illustrates a specific example of the above-mentioned first embodiment. A cache control device according to the second embodiment allocates the area of the cache memory in a plurality of hardware threads. In particular, it is assumed that the area of the cache memory is allocated to the threads on a line basis. In this example, the number of lines (L) of the cache memory, and the number of slots (S) of the processor are power of two. A relationship of L>S is satisfied.

Figure 5:
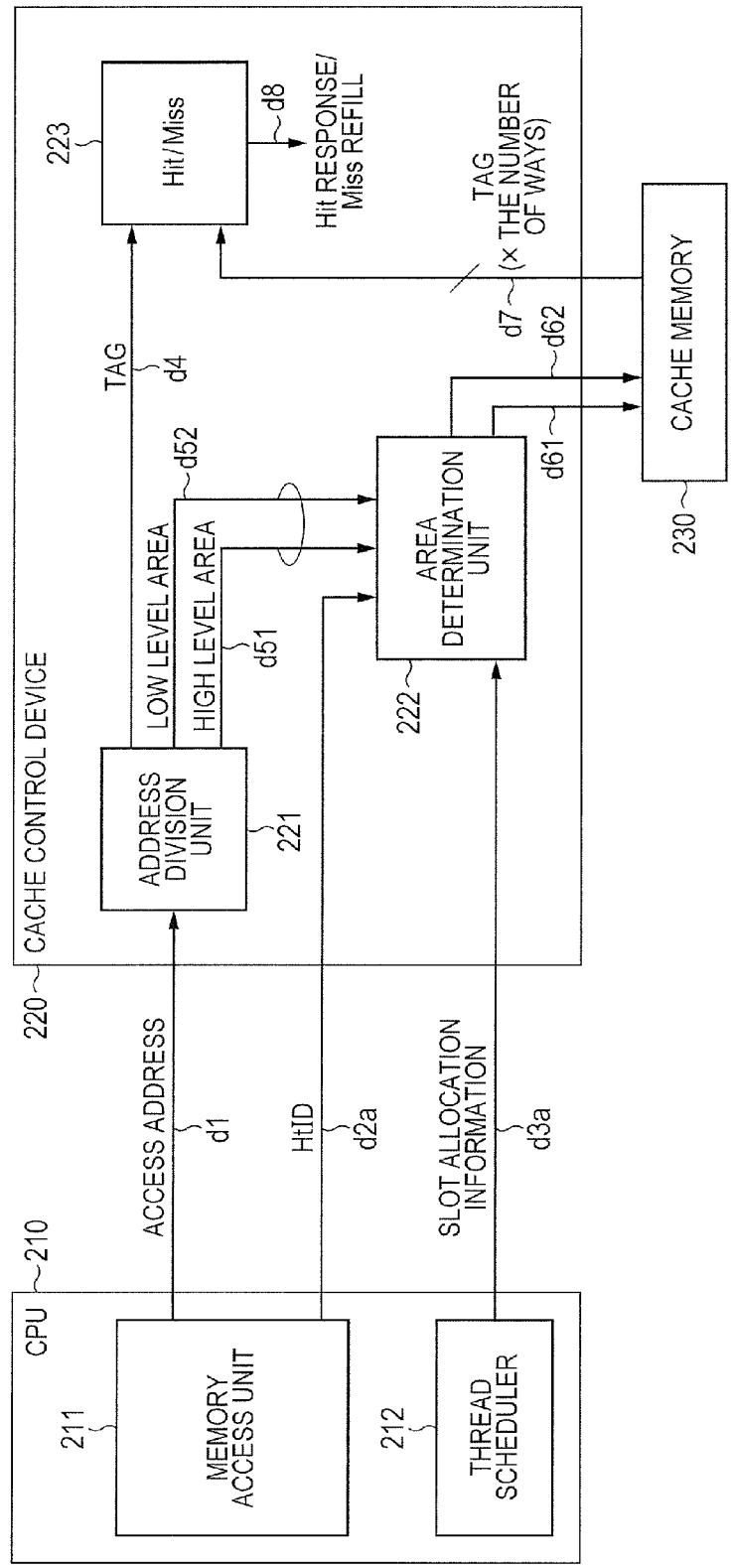
FIG. 5 is a block diagram illustrating a configuration of a computer system including a cache control device according to a second embodiment.

FIG. 5 is a block diagram illustrating a configuration of a computer system including a cache control device 220 according to the second embodiment. FIG. 5 typically illustrates a CPU 210, the cache control device 220, and a cache memory 230 in the computer system that conducts the parallel processing in the real-time control. The cache control device 220 is connected to the CPU 210, the cache memory 230, and the main memory (not shown). In this example, in the cache memory 230, the area of the memory is divided by a plurality of ways, and managed by a plurality of lines within the way. The cache memory 230 is not divided into banks.

The CPU 210, a memory access unit 211, and a thread scheduler 212 represent one of specific examples of the CPU 110, the memory access unit 111, and the execution time allocation unit 112 in FIG. 1, respectively. The CPU 210 is a multithread processor that allocates the time slot (hereinafter referred to merely as "slot") to a plurality of hardware threads (hereinafter referred to merely as "thread") as a plurality of instruction flows, and executes the instruction flows.

The memory access unit 211 notifies the cache control device 220 of a thread ID (HtID) d2a as an example of the ID d2 in FIG. 1. The thread scheduler 212 can allocate an arbitrary execution time to each of the threads. Specifically, the thread scheduler 212 allocates a given number of time slots to the plurality of threads. Also, the thread scheduler 212 holds slot allocation information d3 a which is information for allocating the execution time to the thread. In this example, the slot allocation information d3 a is an example of the allocation ratio d3 of the execution time, which is information indicating a correspondence relationship between the plurality of time slots and the plurality of threads within the CPU 210. In this example, the slot allocation information d3a is information for defining a correspondence between slot numbers and thread numbers. The thread scheduler 212 notifies the cache control device 220 of the slot allocation information d3a. Also, the thread scheduler 212 dynamically changes the slot allocation information d3a according to the execution status of each thread or an instruction of a control program. For example, the slot setting of the scheduler disclosed in Japanese Unexamined Patent Application Publication No. 2010-86128 is applicable to the slot allocation information d3a.

Figure 6:
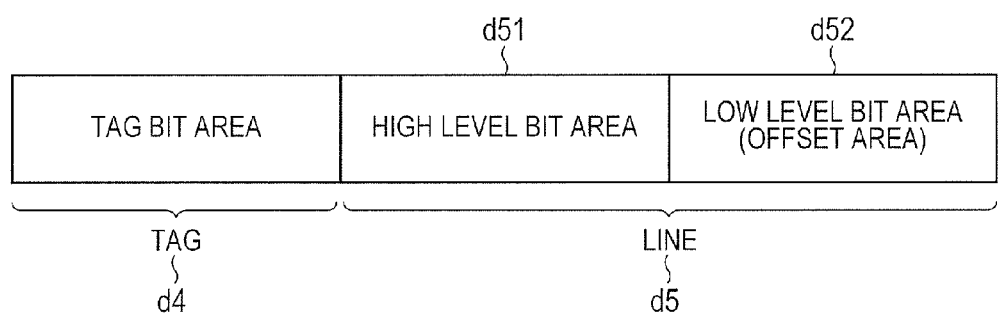
FIG. 6 is a diagram illustrating a bit configuration example of a logical address according to the second embodiment.

The cache control device 220, an address division unit 221, an area determination unit 222, and a hit/miss determination unit 223 represent one of specific examples of the cache control device 120, the address division unit 121, the area determination unit 122, and the hit/miss determination unit 123 in FIG. 1, respectively. The address division unit 221 divides the access address d1 received from the address division unit 221 into the tag d4 and the line d5, and further divides the line d5 into an upper area d51 and a lower area d52. A bit configuration example of a logical address according to the second embodiment is illustrated in FIG. 6.

The area determination unit 222 specifies the area of the cache memory to be allocated to each of the threads on the basis of the time slot included in the slot allocation information d3a. As a result, the execution time can be adequately recognized with the use of a given execution period unit called "time slot", and the area can also be surely specified. Also, in the real-time processing in a single core processor, the actual use ratio of each instruction flow in the processor can be balanced with the use ratio of the cache memory to improve the usability of the overall cache memory.

Also, the area determination unit 222 conducts a variety of accesses to the cache memory 230 according to the thread ID d2a, the upper area d51, and the lower area d52. Also, the area determination unit 222 outputs a line address d61 for designating a line to be accessed to the cache memory 230. Further, the area determination unit 222 outputs an invalidate signal d62 for invalidating a given line within the cache memory 230, to the cache memory 230. The hit/miss determination unit 223 may be equal to the hit/miss determination unit 123.

Figure 7:
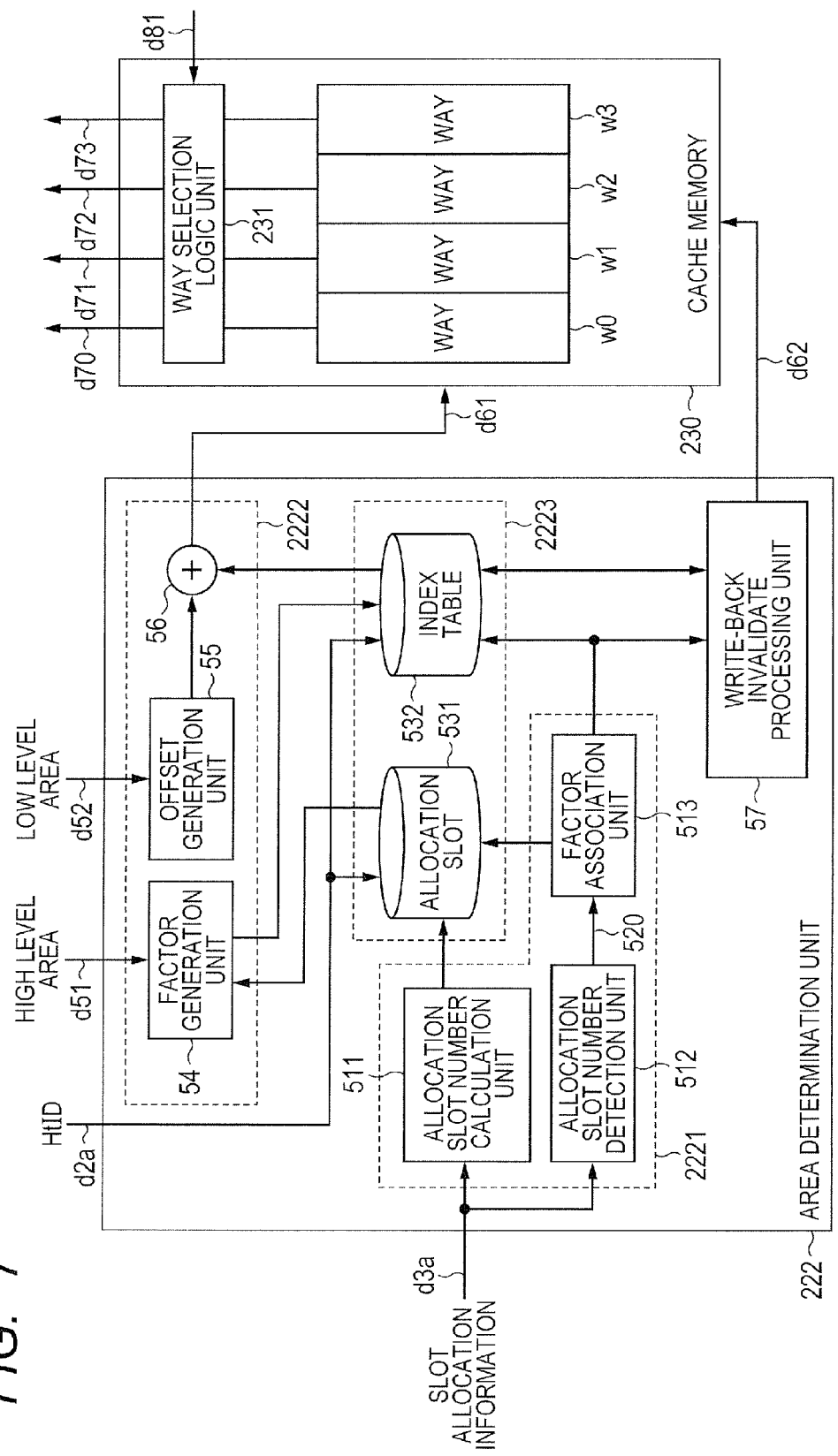
FIG. 7 is a block diagram illustrating a configuration of an area determination unit according to the second embodiment.

FIG. 7 is a block diagram illustrating a configuration of the area determination unit 222 according to the second embodiment. The area determination unit 222 includes an allocation slot number calculation unit 511, an allocation slot number detection unit 512, a parameter association unit 513, an allocation slot number 531, an index table 532, a parameter generation unit 54, an offset generation unit 55, an adder unit 56, and a write-back invalidate processing unit 57. The allocation slot number calculation unit 511 calculates the allocation slot number 531 for each of the threads from the slot allocation information d3a notified from the thread scheduler 212. Specifically, the allocation slot number calculation unit 511 tallies the time slots included in the slot allocation information d3a for each of the threads, and calculates the number of allocation slots for each of the threads. Then, the allocation slot number calculation unit 511 stores the calculated allocation slot number 531 in the storage area as a part of the area allocation information. For that reason, the allocation slot number 531 enables the line within the cache memory 230 which is allocated to each of the threads according to the ratio of the number of allocation slots to be specified from the thread ID d2a. In this way, when the allocation of the execution time is interpreted as the number of allocated time slots, the allocation ratio of the execution time can be easily recognized. Further, the area of the cache memory is set as a line unit to easily specify the area.

Also, the allocation slot number detection unit 512 calculates allocation slot number information 520 which is a slot number allocated to each thread, that is, an index value, from the slot allocation information d3a. Then, the parameter association unit 513 stores the index and the parameter in association with each other for each of the threads in the storage area as an index table index table 532. In this example, the index table 532 manages the correspondence between the parameter and the index value for each of the threads.

For that reason, the allocation slot number calculation unit 511, the allocation slot number detection unit 512, and the parameter association unit 513 configure a processing unit 2221, and the allocation slot number 531 and the index table 532 configure area allocation information 2223.

Figure 8:
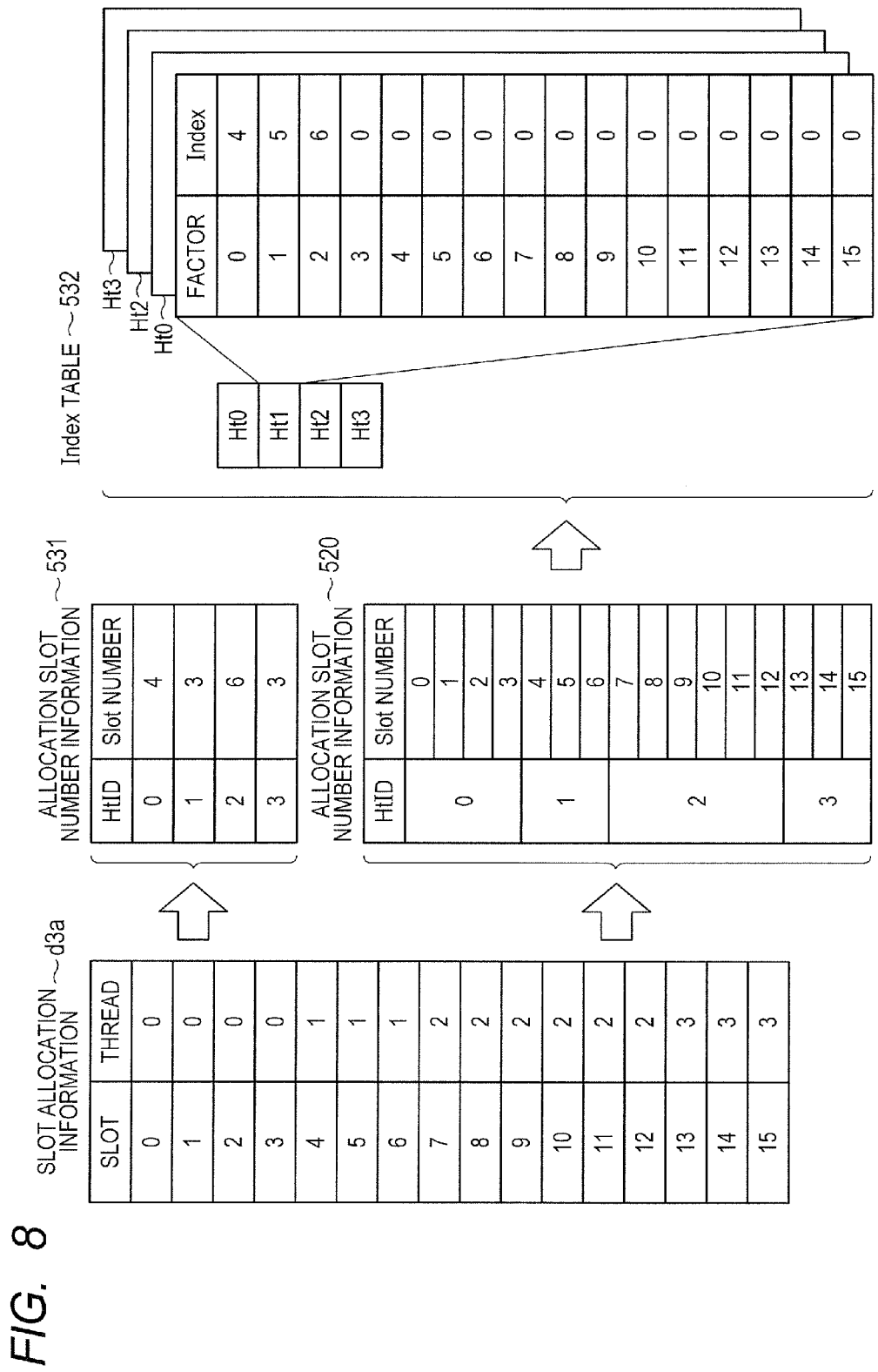
FIG. 8 is a diagram illustrating an example of slot allocation information, allocation slot number information, and an index table according to the second embodiment.

FIG. 8 is a diagram illustrating an example of the slot allocation information d3a, the allocation slot number information 531, and the index table 532 according to the second embodiment. Referring to FIG. 8, it is assumed that the number of slots is "16", the number of threads is "4", the number of ways in the cache memory 230 is "4", and the number of lines per way is "32". In the slot allocation information d3a of FIG. 8, threads ID 0 to 4 are allocated to the time slot numbers 0 to 15. Also, in the allocation slot number 531 in FIG. 8, the numbers of allocation slots "4", "3", "6", and "3" are associated with the threads ID 0 to 4, respectively.

In this example, it is assumed that a maximum value of the parameter is "the total number of slots—1". In FIG. 8, the parameter is "0" to "15", that is, half of the number of lines "32" per way. Also, the slot number allocated to the respective threads is stored in an ascending order from the parameter "0" in the index value. In FIG. 8, index values "4" to "6" are stored in association with the parameters "0" to "2" in a thread 1, and an index value "0" is stored in the index "3", and the subsequent indexes.

Returning to FIG. 7, a description will be continued. Also, the area determination unit 222 specifies the allocation slot number 531 corresponding to the thread ID d2a received from the address division unit 221, and outputs the specified allocation slot number 531 to the parameter generation unit 54. That is, the area determination unit 222 determines the area of the cache memory 230 to be accessed on the basis of the identification information on the instruction flows included in the access request to the cache memory 230, and the number of allocation slots. As a result, the area to be accessed can be efficiently specified, and the access request can be speeded up.

In this example, the upper area d51 corresponds to the index in the line d5 of the access address d1. The upper area d51 is used to specify the line within the cache memory 230. In FIG. 7, the upper area d51 is expressed by four bits. The lower area d52 is used to generate the offset of the cache memory 230. In this example, a bit width of the lower area d52 can be calculated by the following Expression (1).

$$\text{Bit Width}=\log_2 (\text{total number of lines/total number of slots}) \qquad (1)$$

For that reason, in FIG. 7, the lower area d52 is expressed by one bit.

The parameter generation unit 54 generates the parameter from the upper area d51 acquired from the address division unit 221, and the allocation slot number 531 specified by the thread ID d2a, and outputs the index to the index table 532. For example, the parameter generation unit 54 may divide the upper area d51 by the allocation slot number 531, and set its remainder as the parameter. Thereafter, the index table 532 specifies an appropriate index value from the thread ID d2a and the parameter from the parameter generation unit 54, and outputs the specified index value to the adder unit 56.

The offset generation unit 55 generates the offset of the line on the basis of the lower area d52 acquired from the address division unit 221. For example, in this case, the lower area d52 is a value of one bit, that is, "0" or "1", and therefore converted to "0" or "16". Then, the adder unit 56 adds the offset generated by the offset generation unit 55 to an index value output from the index table 532, and accesses the cache memory 230 as the line address d61 to be accessed. For that reason, the parameter generation unit 54, the offset generation unit 55, and the adder unit 56 configure an allocation control unit 2222.

The cache memory 230 includes a way selection logic unit 231 and ways w0 to w3. In this example, the way selection logic unit 231 according to the second embodiment fixedly selects all of the ways w0 to w3. Also, if a hit/miss determination is miss in the hit/miss determination unit 223, that is, at the time of miss refill, the way selection logic unit 231 selects the way according to a way selection signal d81 for selecting a way to be written which is output from the hit/miss determination unit 223. The respective ways w0 to w3 are obtained by dividing the storage area of the cache memory 230 into quarters. Also, each of the ways is divided into 32 lines.

As a result, the cache memory 230 reads data of the appropriate line address d61 from all of the ways w0 to w3. In this situation, because all of the ways w0 to w3 are selected, the way selection logic unit 231 outputs the data read from the ways w0 to w3 to the hit/miss determination unit 223 as tag d70 to d73, respectively. Then, the hit/miss determination unit 223 compares a tag included in the read line with the tag d1 from the address division unit 221 to conduct the hit/miss determination.

Figure 9:
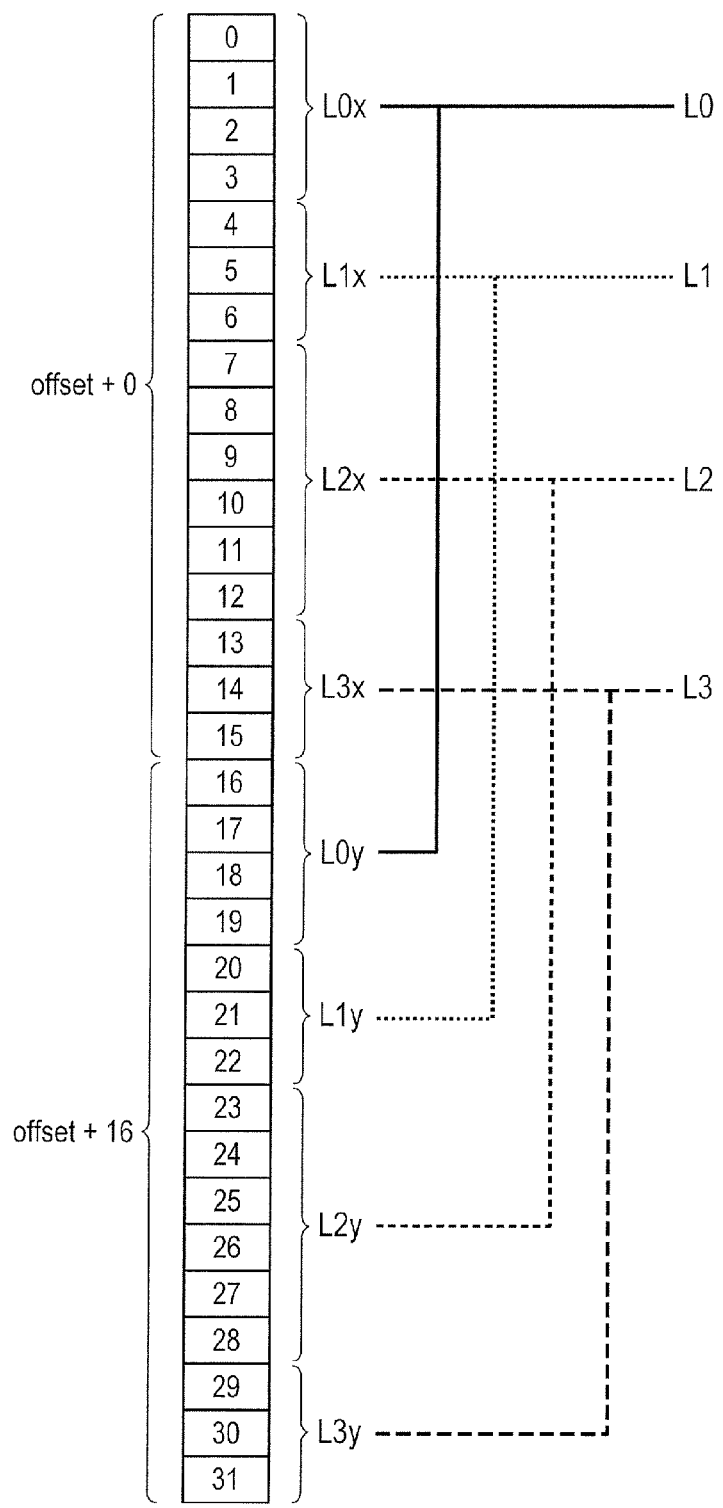
FIG. 9 is a diagram illustrating one example of data within a cache memory at the time of determining an area according to the second embodiment.

FIG. 9 is a diagram illustrating an example of data per one way within the cache memory 230 at the time of determining the area according to the second embodiment. The way in FIG. 9 is divided into 32 lines, and the respective lines are managed to belong to any one of line groups L0, L1, L2, and L3. In this example, the line group L0 includes line groups L0x and L0y, the line group L1 includes line groups L1x and L1y, the line group L2 includes line groups L2x and L2y, and the line group L3 includes line groups L3x and L3y. For that reason, the line groups L0x, L1x, L2x, and L3x are specified by the index value at the time of the offset "+0", and the line groups L0y, L1y, L2y, and L3y are specified by the index value at the time of the offset "+16".

For that reason, for example, the thread 1 specified from the index table 532 in FIG. 8 corresponds to the line group L1, and specifically, the lines "4" to "6" belonging to the line group L1x and the lines "20" to "22" belonging to the line group L1y are allocated as the cache areas.

Figure 10:
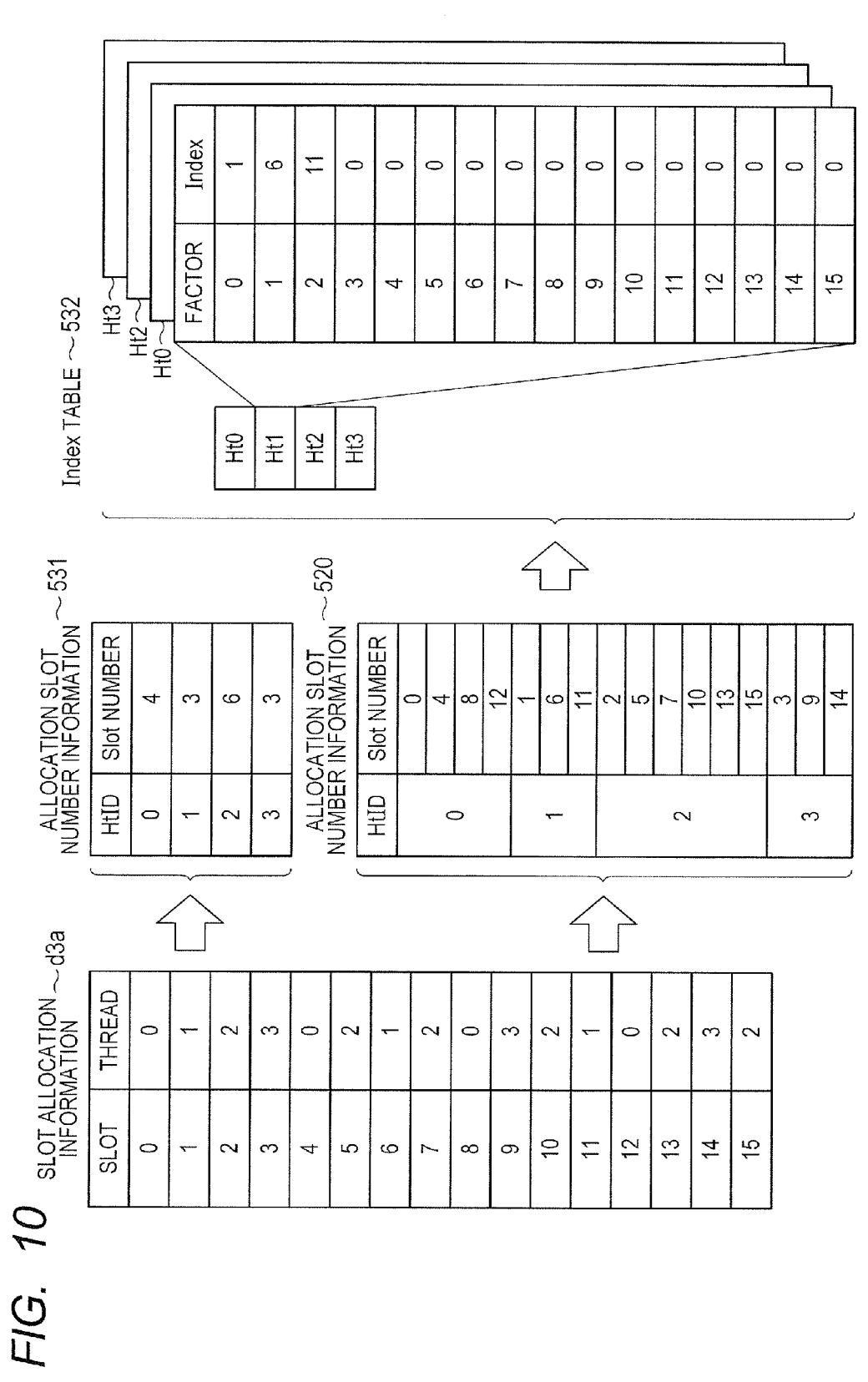
Figure 11:
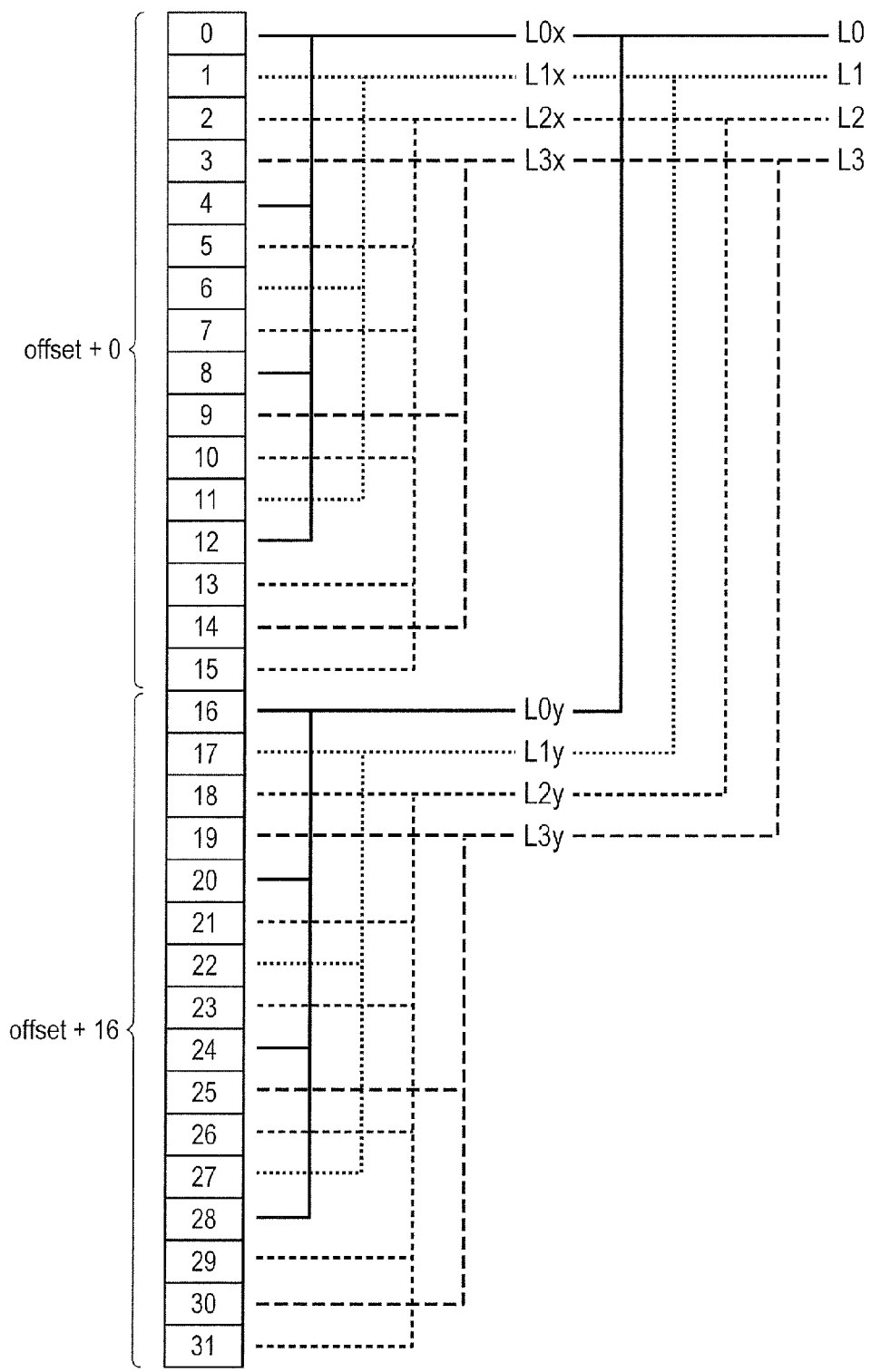
FIG. 11 is a diagram illustrating another example of data within the cache memory at the time of determining an area according to the second embodiment.

The example of the allocation of the threads in the slot allocation information d3a according to the second embodiment is not limited to that of FIG. 8. FIG. 10 is a diagram illustrating another example of the slot allocation information, the allocation slot number information, and the index table according to the second embodiment. In the slot allocation information d3a of FIG. 10, the thread numbers are allocated to the respective slots at random. Referring to FIG. 10, like FIG. 8, in the allocation slot number 531, the threads ID 0 to 4 are associated with the numbers of allocation slots "4", "3", "6", and "3", respectively. However, in the allocation slot number information 520 of FIG. 10, the allocation slot numbers of the respective threads are different from those in FIG. 8. Likewise, the contents of the index table 532 are also different from those in FIG. 8. For that reason, the line groups to which the respective lines within the cache memory at the time of determining the area belong are illustrated as illustrated in FIG. 11. In this way, according to the second embodiment, the allocation state within the slot allocation information d3a and the allocation state of the cache memory 230 to the line groups of the respective lines within the respective ways can be synchronized with each other. For that reason, all of the threads allocated in the slot allocation information d3a can be allocated to any line of the cache memory 230.

Figure 12:
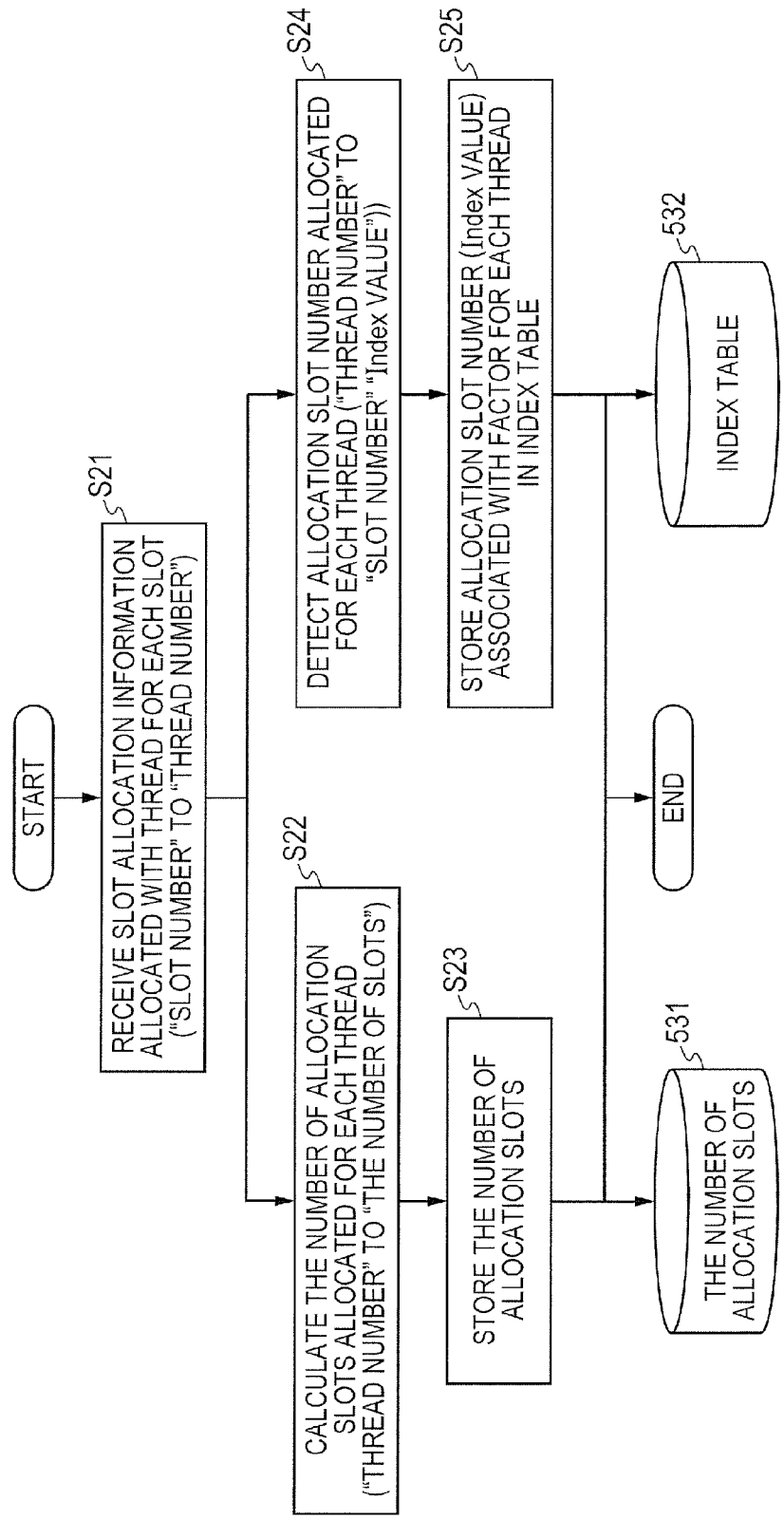
FIG. 12 is a flowchart illustrating a flow of processing in an area division method according to the second embodiment.

FIG. 12 is a flowchart illustrating a flow of processing in an area division method according to the second embodiment. First, the area determination unit 222 receives the slot allocation information d3a ("slot number" to "thread number") to which the threads are allocated for each of the slots, from the thread scheduler 212 (S21). For example, the slot allocation information d3a may be notified the area determination unit 222 of every time the thread scheduler 212 sets or updates the slot allocation information d3a. Alternatively, the area determination unit 222 may regularly read the slot allocation information d3a.

Subsequently, the allocation slot number calculation unit 511 calculates the allocation slot number 531 ("thread number" to "slot number") allocated to each of the threads (S22). For example, the allocation slot number calculation unit 511 tallies the number of slots allocated for each of the threads from the slot allocation information d3a. Then, the allocation slot number calculation unit 511 stores the tallied value in the storage area as the allocation slot number 531 (S23).

Also, the allocation slot number detection unit 512 detects the allocation slot number ("thread number" to "slot number" (index value)) allocated for each of the threads from the slot allocation information d3a (S24). For example, the allocation slot number detection unit 512 detects the slot number allocated for each of the threads from the slot allocation information d3a, and sets the detected slot number as the index value. Then, the parameter association unit 513 stores the index value detected in each of the threads in association with the parameter in the storage area as the index table 532 (S25).

Figure 13:
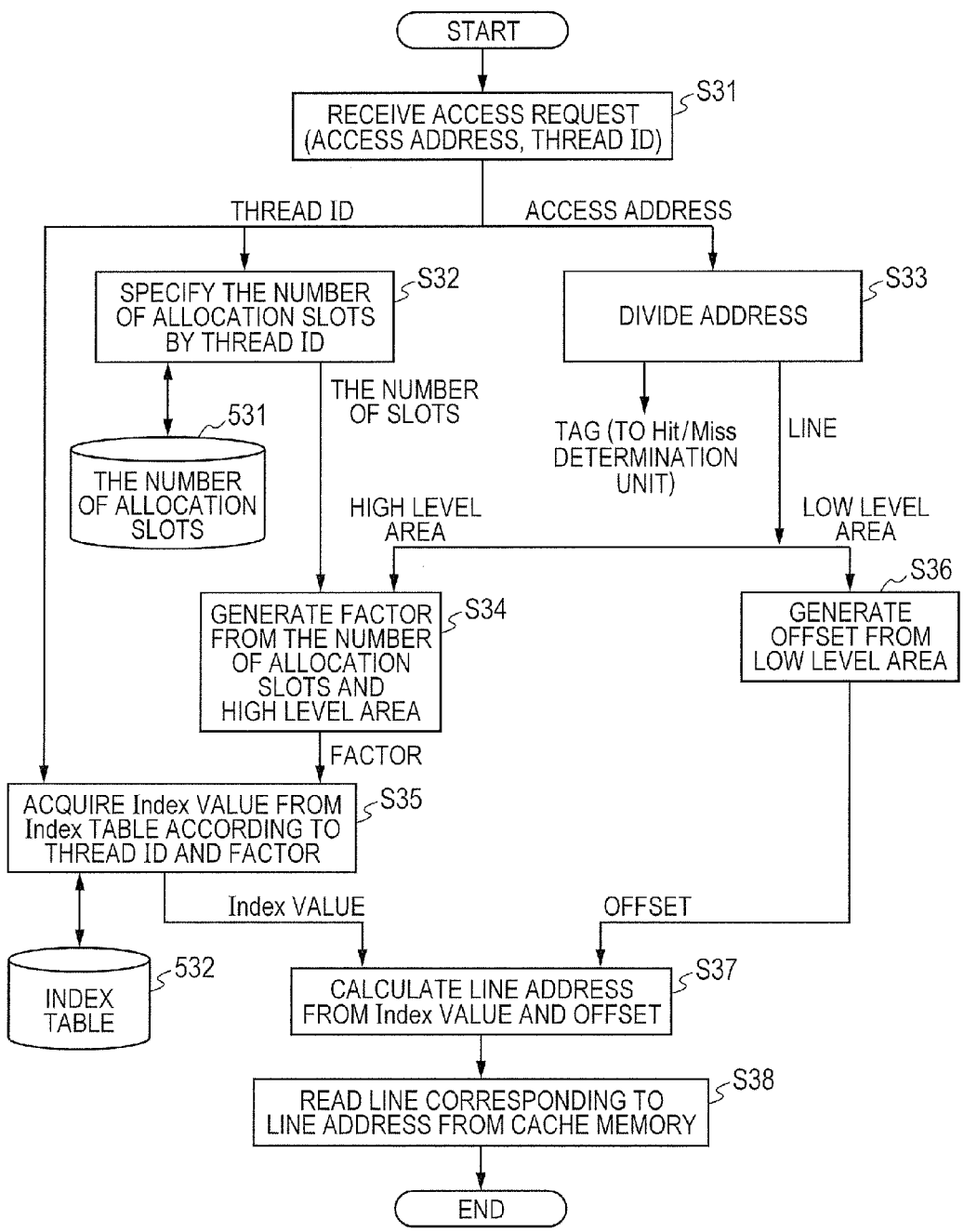
FIG. 13 is a flowchart illustrating a flow of processing in an access processing method according to the second embodiment.

FIG. 13 is a flowchart illustrating a flow of processing in an access processing method according to the second embodiment. First, the area determination unit 222 receives the access address d1 and the thread ID d2a as an access request to the cache memory 230 from the memory access unit 211 (S31). Then, the area determination unit 222 specifies the allocation slot number 531 by the thread ID d2a (S32). In FIGS. 8 and 10, if the thread ID d2a is "1", "3" is specified as the allocation slot number 531.

Also, the address division unit 221 divides the access address d1 (S33). For example, the address division unit 221 divides the access address d1 into the tag d4 and the line d5, and divides the line d2 into the upper area d51 and the lower area d52. The memory access unit 211 may divide the access address d1 into the tag d4 and the line d5 in advance, or may further divide the line d5 into the upper area d51 and the lower area d52, and notify the cache control device 220 of the divided areas as the access request.

Then, the parameter generation unit 54 generates the parameter according to the allocation slot number 531 specified in Step S32, and the upper area d51 divided in Step S33 (S34). In FIG. 8, because the parameter generation unit 54 divides the upper area d51 by "3" of the allocation slot number 531, the remainder becomes any one of "0", "1", and "2". Thereafter, the area determination unit 222 acquires the index value from the index table 532 according to the thread ID d2a and the parameter (S35). For example, when the parameter is "1", the index value becomes "5" in FIG. 8, and "6" in FIG. 10.

Also, the offset generation unit 55 generates the offset from the lower area d52 in parallel to Step S34 (S36). For example, if the lower area d52 is "1", the offset is converted to "16".

Thereafter, the adder unit 56 calculates the line number from the index value and the offset (S37). For example, in FIG. 8, in the case of the index value "5" and the offset "16", the line number "21" is calculated. Also, in FIG. 10, in the case of the index value "6" and the offset "16", the line number "22" is calculated. Then, the area determination unit 222 reads the line corresponding to the line number from the cache memory 230 (S38). In FIG. 8, the area determination unit 222 reads the line "21" in the way w0 within the cache memory 230. The line belongs to the line group L1, and therefore is read from the area corresponding to the thread 1 designated by the thread ID d2a. Likewise, the area determination unit 222 reads the line "21" from the ways w1 to w3. In FIG. 10, the area determination unit 222 reads the line "22" in the ways w0 to 23 within the cache memory 230. In this case, likewise, the line belongs to the line group L1, and therefore is read from the area corresponding to the thread 1 designated by the thread ID d2a.

Subsequently, a case in which the allocation ratio of the slot in the thread is changed will be described. As described above, the allocation ratio of the execution time in each of the threads is dynamically changed by the thread scheduler 212. In this case, the area determination unit 222 updates the allocation slot number 531 and the index table 532, and conducts the write-back invalidate processing on the cache memory 230.

That is, the area determination unit 222 updates the area of the cache memory to be allocated to the changed thread according to the allocation ratio of the execution time after changing. For example, when the allocation ratio of the execution time in a certain thread is changed to be higher, a frequency of access to the cache in the thread is also generally increased. For that reason, the amount of allocation of the area of the cache memory in the appropriate thread is also increased with an increase in the access frequency, thereby being capable of maintaining the balance between the use ratio of the resource and the use ratio of the cache memory. Hence, the usability of the cache memory can be continuously enhanced.

Further, the area determination unit 222 nullifies the area of the cache memory which has already been allocated to the instruction flows whose allocation ratio of the execution time has been reduced by the change, by an amount as large as the reduction of the allocation ratio, together with the updating. Thus, a newly allocated area of the cache memory can be used as soon as required.

For that reason, the write-back invalidate processing unit 57 outputs the invalidate signal d62 for invalidating the appropriate line to the cache memory 230 according to the updating of the index table 532. In other words, the write-back invalidate processing unit 57 writes back data of the line corresponding to the designated index value in the main memory, and also invalidates the appropriate line. In this situation, the write-back invalidate processing unit 57 executes all of the ways in a cross-sectional manner.

Figure 14:
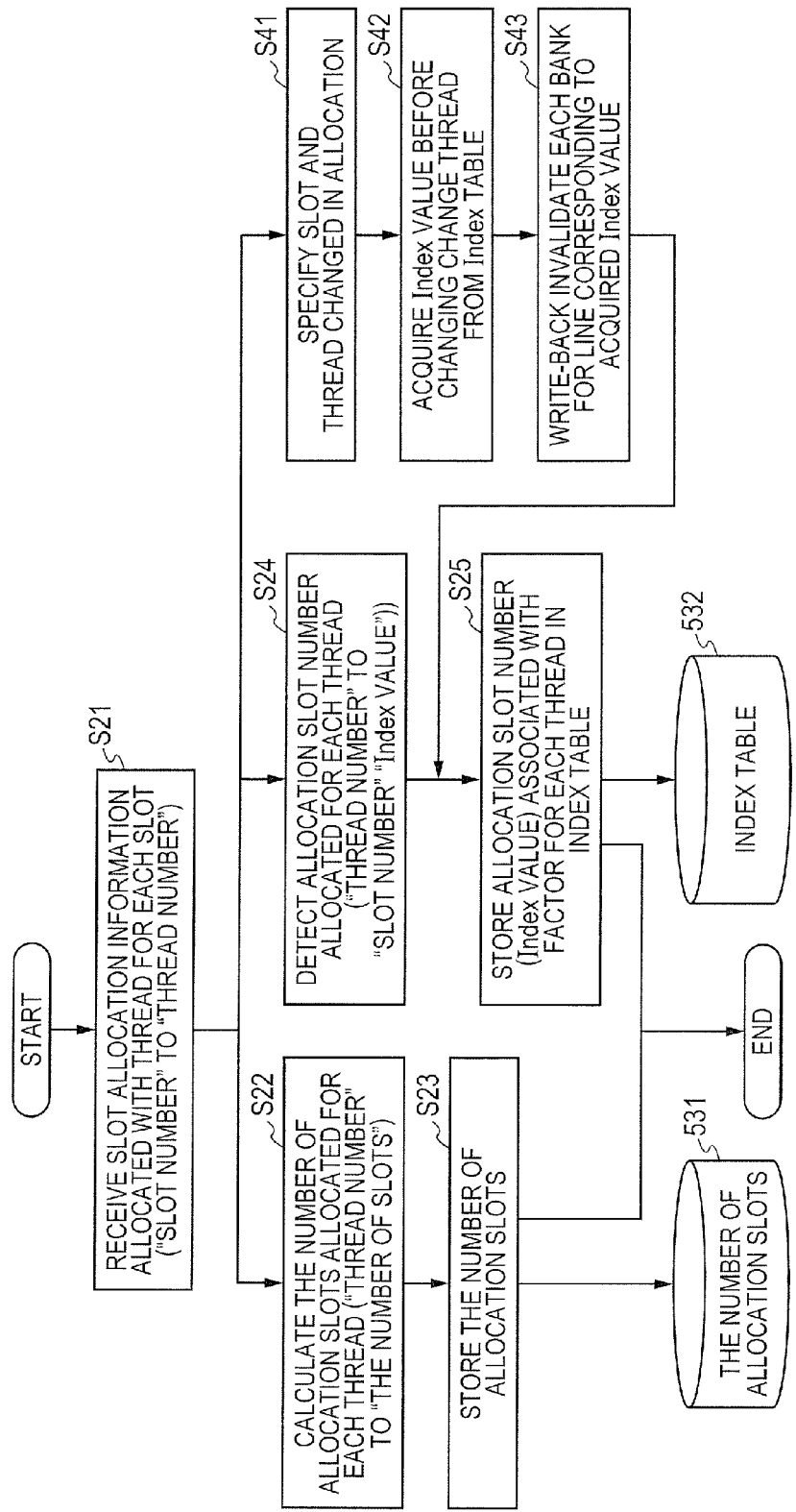
FIG. 14 is a flowchart illustrating a flow of an allocation changing process according to the second embodiment.
Figure 15:
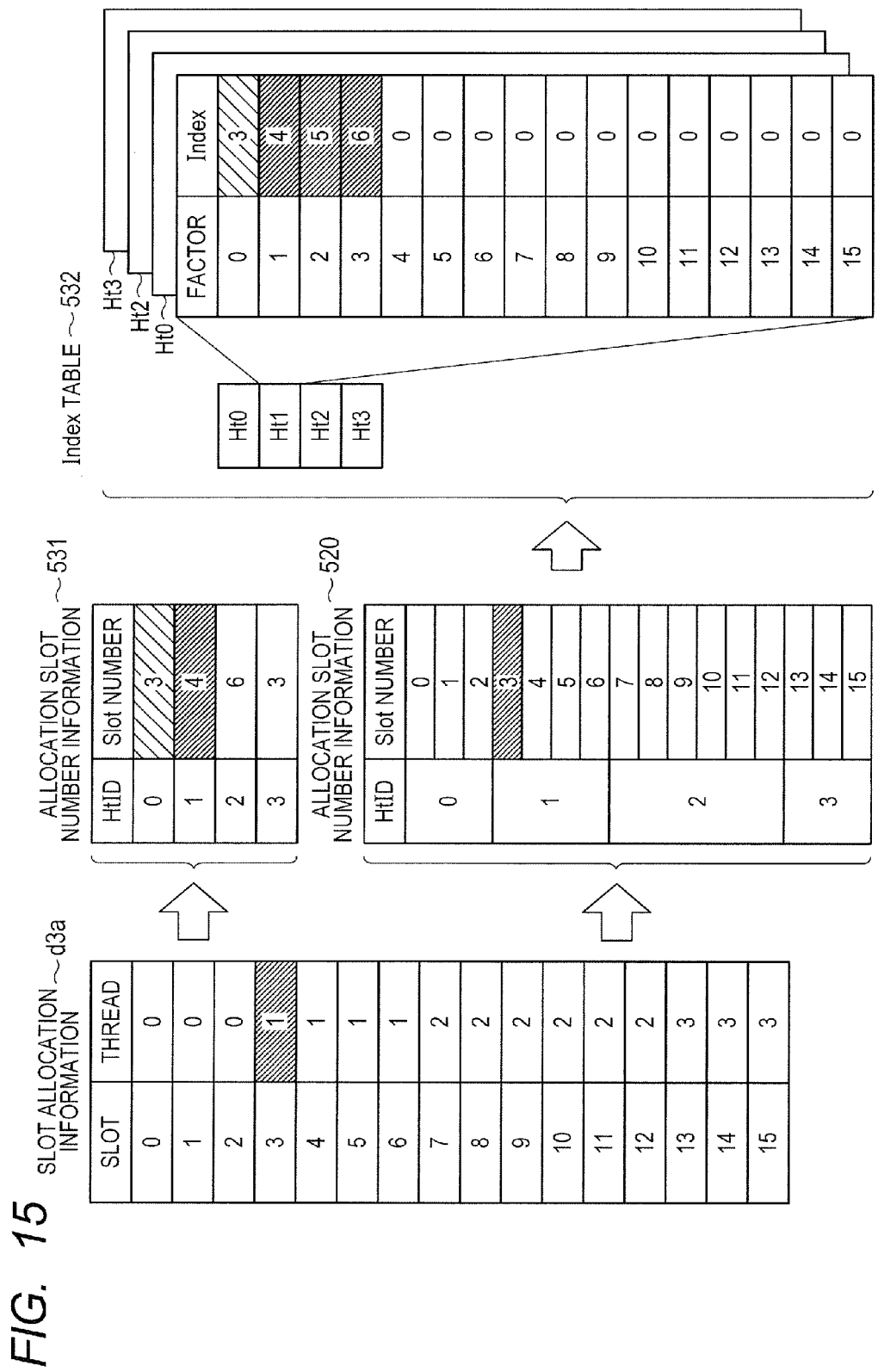
FIG. 15 is a diagram illustrating an example of slot allocation information, allocation slot number information, and an index table according to the second embodiment.
Figure 16:
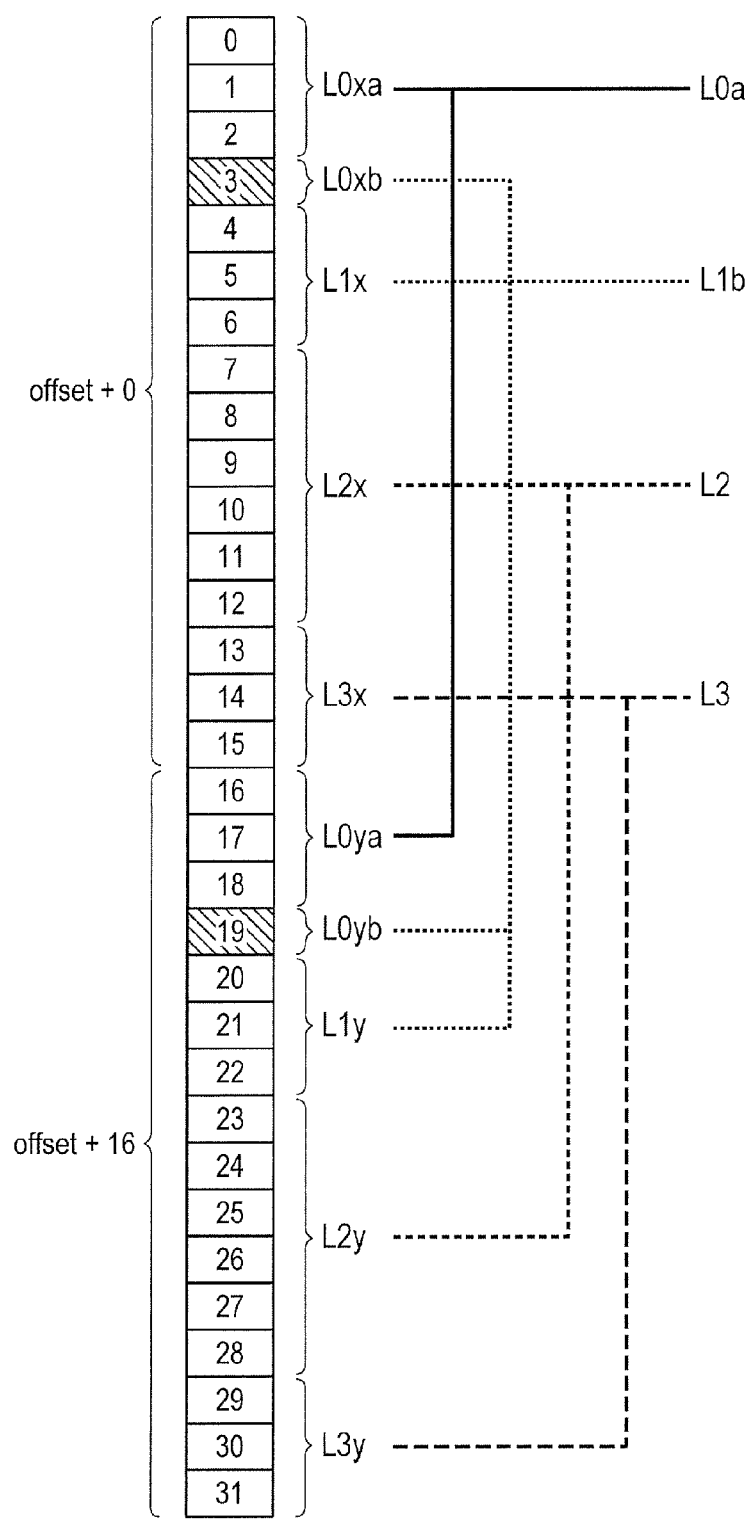
FIG. 16 is a diagram illustrating one example of data within the cache memory after changing an allocation according to the second embodiment.

Now, the operation when the allocation ratio of the slot in the thread is changed will be described with reference to FIGS. 14, 15, and 16. FIG. 14 is a flowchart illustrating a flow of an allocation changing process according to the second embodiment. The same processing as that in FIG. 12 is denoted by identical reference numerals or symbols. FIG. 15 is a diagram illustrating an example of the slot allocation information d3a, the allocation slot number information 531, and the index table 532 after the allocation has been changed according to the second embodiment. FIG. 16 is a diagram illustrating one example of data per one way within the cache memory after the allocation has been changed according to the second embodiment.

Referring to FIG. 15, a case in which the thread 0 allocated to the slot 3 is changed to the thread 1 will be described. In this situation, the thread scheduler 212 updates the slot allocation information d3a. Then, the area determination unit 222 receives the changed slot allocation information d3a (S21).

Subsequently, the allocation slot number calculation unit 511 updates the changed allocation slot number 531. Specifically, the allocation slot number calculation unit 511 calculates the allocation slot number "3" after the thread 0 has been changed, and also calculates the allocation slot number "4" after the thread 1 has been changed (S22). Then, the allocation slot number calculation unit 511 updates the number of allocation slots of the thread 0 among the allocation slot number 531 from "4" to "3", and the number of allocation slots of the thread 1 from "3" to "4" (S23 in FIG. 14). Also, the allocation slot number detection unit 512 detects the changed allocation slot number (S24). Specifically, the allocation slot number detection unit 512 detects the changed allocation slot number (S24). Specifically, the allocation slot number detection unit 512 calculates the allocation slot number "3" of the thread 1 according to the change.

In addition, the area determination unit 222 specifies the slot and the thread, whose allocation has been changed (S41). In this example, the slot number "3" as well as the thread 0 and the thread 1 are specified. Then, the area determination unit 222 acquires the index value before the changed thread is changed from the index table 532 (S42). Specifically, the area determination unit 222 acquires the index value "3" associated with the parameter in the thread 0 to which the slot number "3" has been allocated before changing.

Then, the write-back invalidate processing unit 57 write-back invalidates the respective ways for the line corresponding to the acquired index value (S43). For example, in the way w0, the line "3" and the line "19" are write-back invalidated (FIG. 16). Likewise, the ways w1 to w3 are write-back invalidated. In this example, the line "3" belongs to the line group L0xb, and the line "19" belongs to the line group L0yb.

Thereafter, the parameter association unit 513 updates the index table 532 of the changed thread (S25). Specifically, the parameter association unit 513 updates the index value of the parameter "3" of the thread 0 to "0". Also, the area determination unit 222 updates the indexes of the parameters "0" to "3" of the thread 1 to "3" to "6". As a result, the line groups L0xa and L0xb among the line group L0 before changing are sequentially allocated to the thread 0, and become the changed line group L0a. Also, when there occurs an access to the parameter "0" of the thread 1 in the future, the line groups L0xb and L0yb are added to the changed line group L1b.

In this way, in the second embodiment, even if the allocation ratio of the slot in the thread is dynamically changed, the balance between the ratio of the processing speed and the allocation ratio of the area can be maintained, that is, synchronized. Hence, the usability of the overall cache memory can be improved.

Third Embodiment

Figure 17:
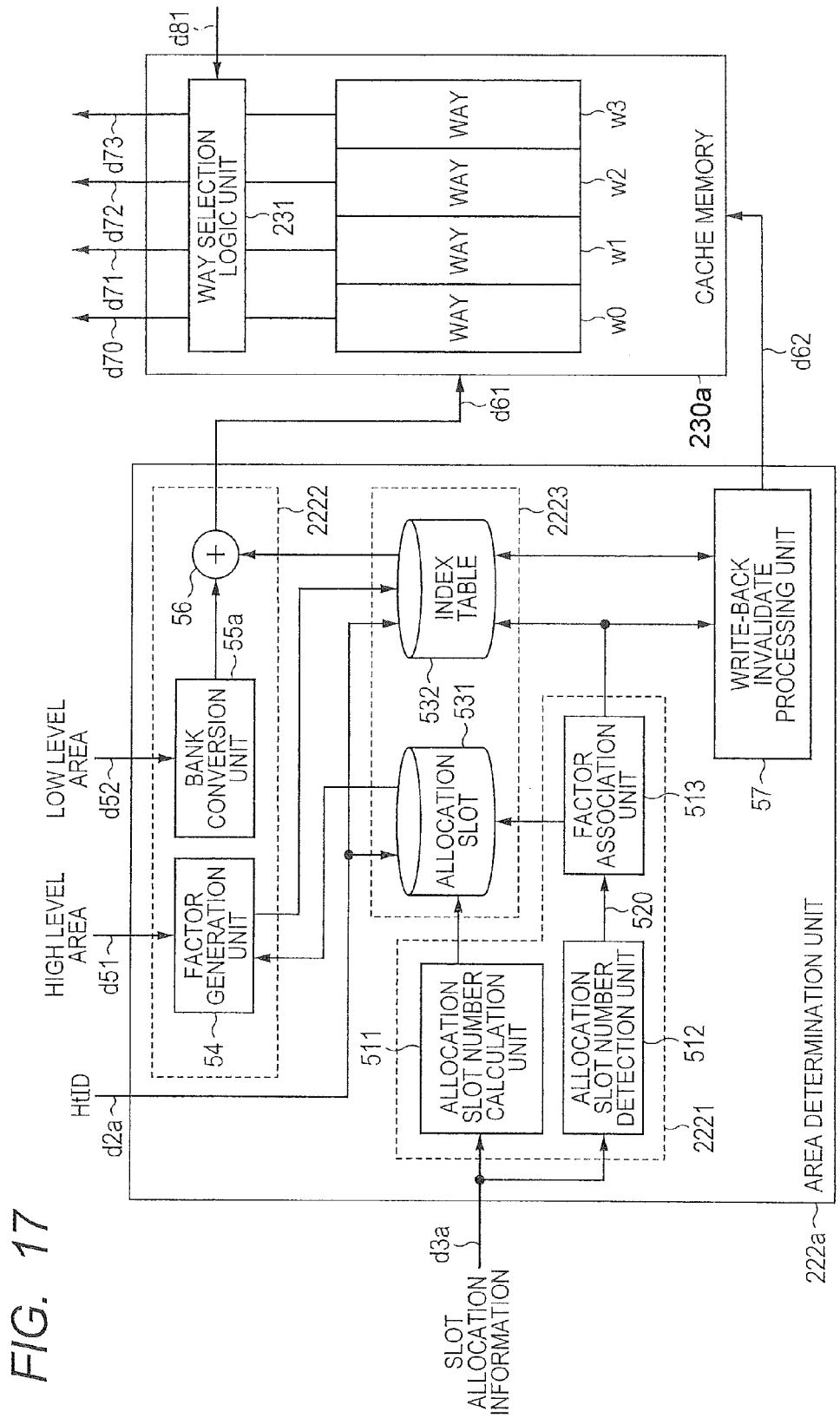
FIG. 17 is a block diagram illustrating a configuration of an area determination unit according to a third embodiment.

In a third embodiment, a description will be given of a case in which the cache memory divided into banks can be realized as in the above-mentioned second embodiment where bank segmentation is not conducted. FIG. 17 is a block diagram illustrating a configuration of an area determination unit 222a according to the third embodiment. The configuration of the computer system including the cache control device according to the third embodiment is identical with that in FIG. 5, and therefore will be omitted from the drawings and the description.

Figure 18:
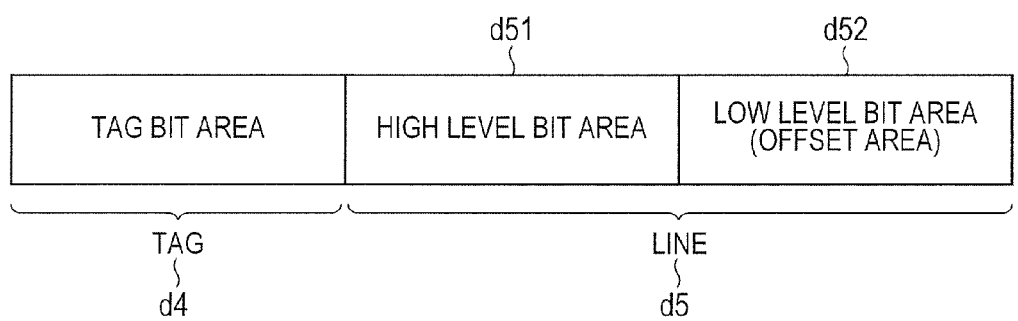
FIG. 18 is a diagram illustrating a bit configuration example of a logical address according to the third embodiment.

In the area determination unit 222a, the offset generation unit 55 in the configuration of the area determination unit 222 is replaced with a bank conversion unit 55a. The bank conversion unit 55a converts a lower area d22 to the offset of the line. For example, in this example, the lower area d22 is a value of one bit, that is, "0" or "1", and therefore converted to "0" or "16". That is, the lower area d52 is used to specify the bank. A bit configuration example of the logical address according to the third embodiment is illustrated in FIG. 18.

Then, the adder unit 56 adds the offset converted by the bank conversion unit 55a to the index value output from the index table 532, and accesses a cache memory 230a as the line to be accessed. As a result, the cache memory 230a reads data of the appropriate line from all of the ways w0 to w3.

Figure 19:
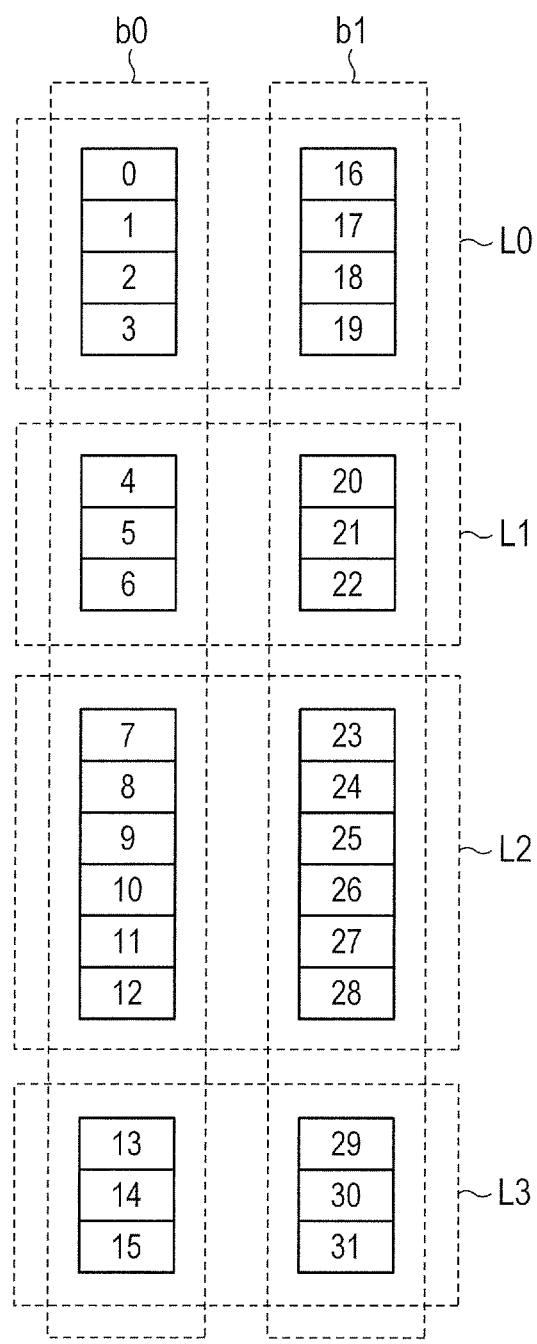
FIG. 19 is a diagram illustrating one example of data within the cache memory at the time of determining an area when using a bank according to the third embodiment.

Also, the cache memory 230a has four ways of the ways w0 to w3, and each of the ways is grouped into two banks. FIG. 19 is a diagram illustrating an example data per way within the cache memory at the time of determining the area when using the banks. In this example, the number of banks is "2" per way, the number of lines is "32", that is, the number of lines is "16" per bank. For example, the way w0 has the banks b0 and 1. The lines "0" to "15" belong to the bank b0, and the lines "16" to "31" belong to the bank b1. When the line within the way is grouped into the banks, the area determination unit 222a designates the bank number of "0" or "1", and the line numbers of "0" to "15", thereby being capable of accessing a desired line. For that reason, the line number to be designated is not the total number of lines "32" per way, but can be set as "16" which is half of "32", and the capacity of the area determination unit 222a can be suppressed as compared with the area determination unit 222.

For example, in the way w0 of the cache memory 230a, the lines "0" to "3" of the bank b0 and the lines "16" to "19" of the bank b1 are allocated as the cache area of the thread 0 as the line group L0. Likewise, the line group L1 is allocated as the cache area in the thread 1, the line group L2 is allocated as the cache area in the thread 2, and the line group L3 is allocated as the cache area in the thread 3.

Figure 20:
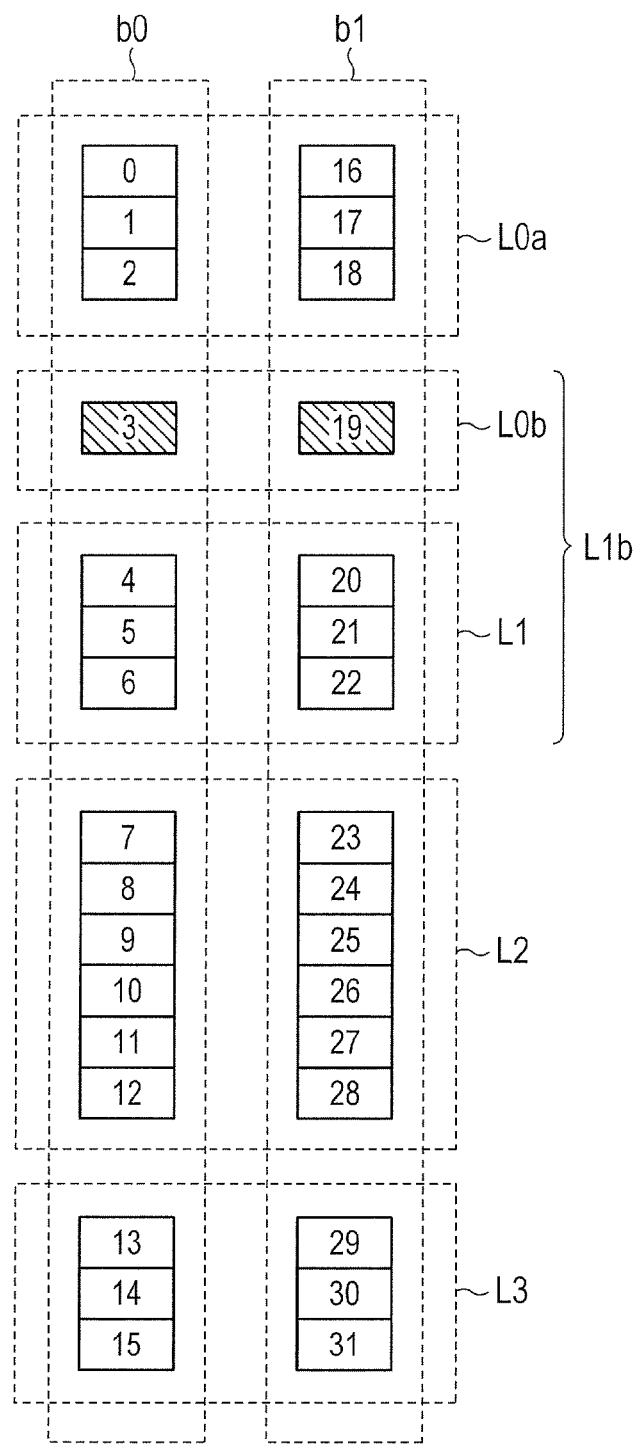
FIG. 20 is a diagram illustrating one example of data within the cache memory after changing an allocation when using the bank according to the third embodiment.

FIG. 20 is a diagram illustrating one example of data within the cache memory after changing an allocation when using the bank according to the third embodiment. In this example, as in FIG. 15, a case in which the thread 0 allocated to the slot 3 is changed to the thread 1 will be described. In this situation, in the way w0, the line "3" of the bank b0 and the line "19" of the bank b1 are write-back invalidated. Likewise, in the ways w0 to w3, the lines are write-back invalidated. In this example, it is assumed that the lines "3" and "19" belong to the line group L0b. Among the line group L0 before changing, the line group L0a is sequentially allocated to the thread 0, and if there occurs an access to the parameter "0" of the thread 1 in the future, the line group L0b is added to the line group L1.

In this way, the third embodiment can have the same advantages as those in the above-mentioned second embodiment.

Fourth Embodiment

A fourth embodiment shows a specific example of the above-mentioned first embodiment. In particular, a difference from the above-mentioned second and third embodiments resides in that the area of the cache memory is allocated to the thread on a way basis. In this example, it is assumed that the number of ways in the cache memory is equal to the number of slots in the processor.

Figure 21:
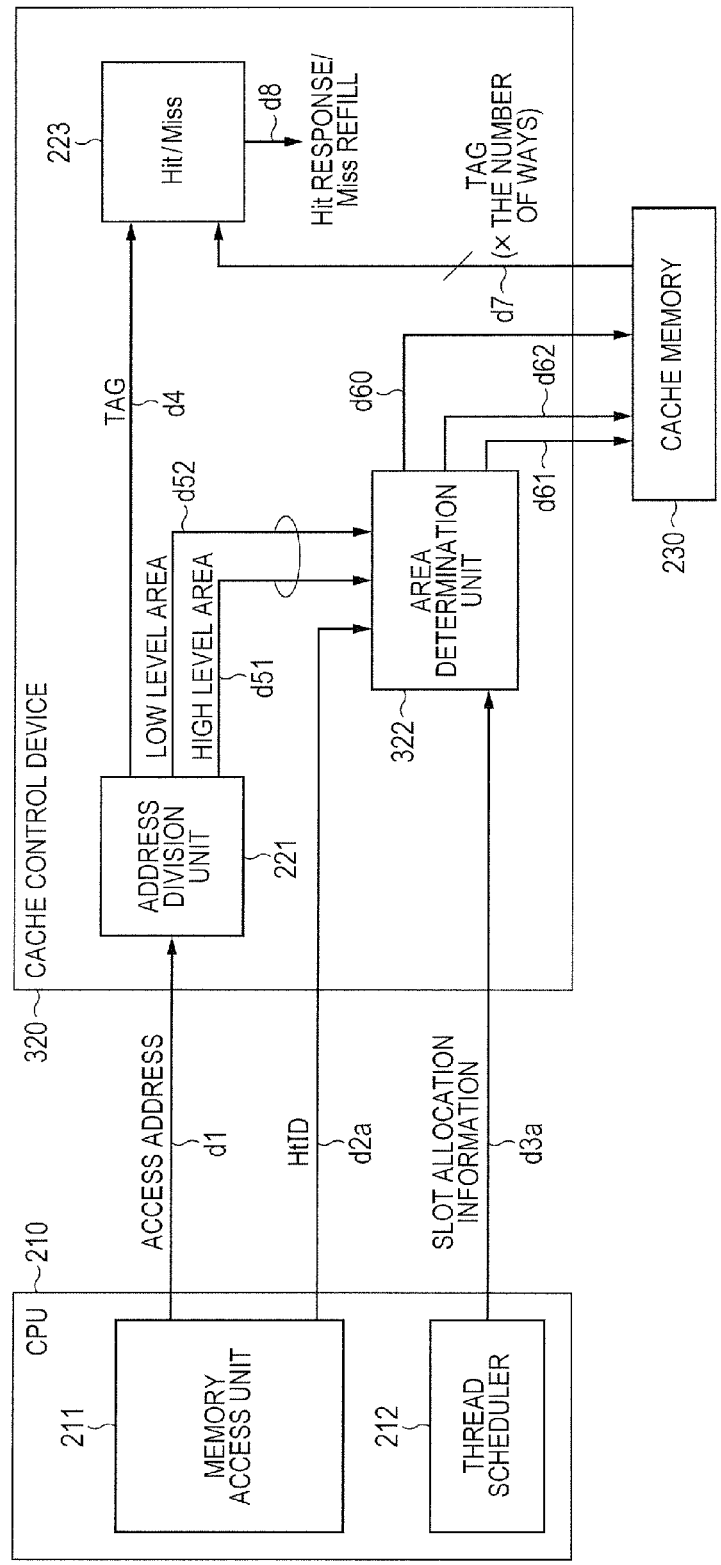
FIG. 21 is a block diagram illustrating a configuration of a computer system including a cache control device according to a fourth embodiment.

FIG. 21 is a block diagram illustrating a configuration of a computer system including a cache control device 320 according to the fourth embodiment. In FIG. 21, the same configurations at those in FIG. 5 are denoted by identical reference numerals or symbols, and their description will be omitted. An area determination unit 322 outputs a way selection signal d60 for selecting the way to be accessed to the cache memory 230 in addition to a line address d61 and an invalidate signal d62.

Figure 22:
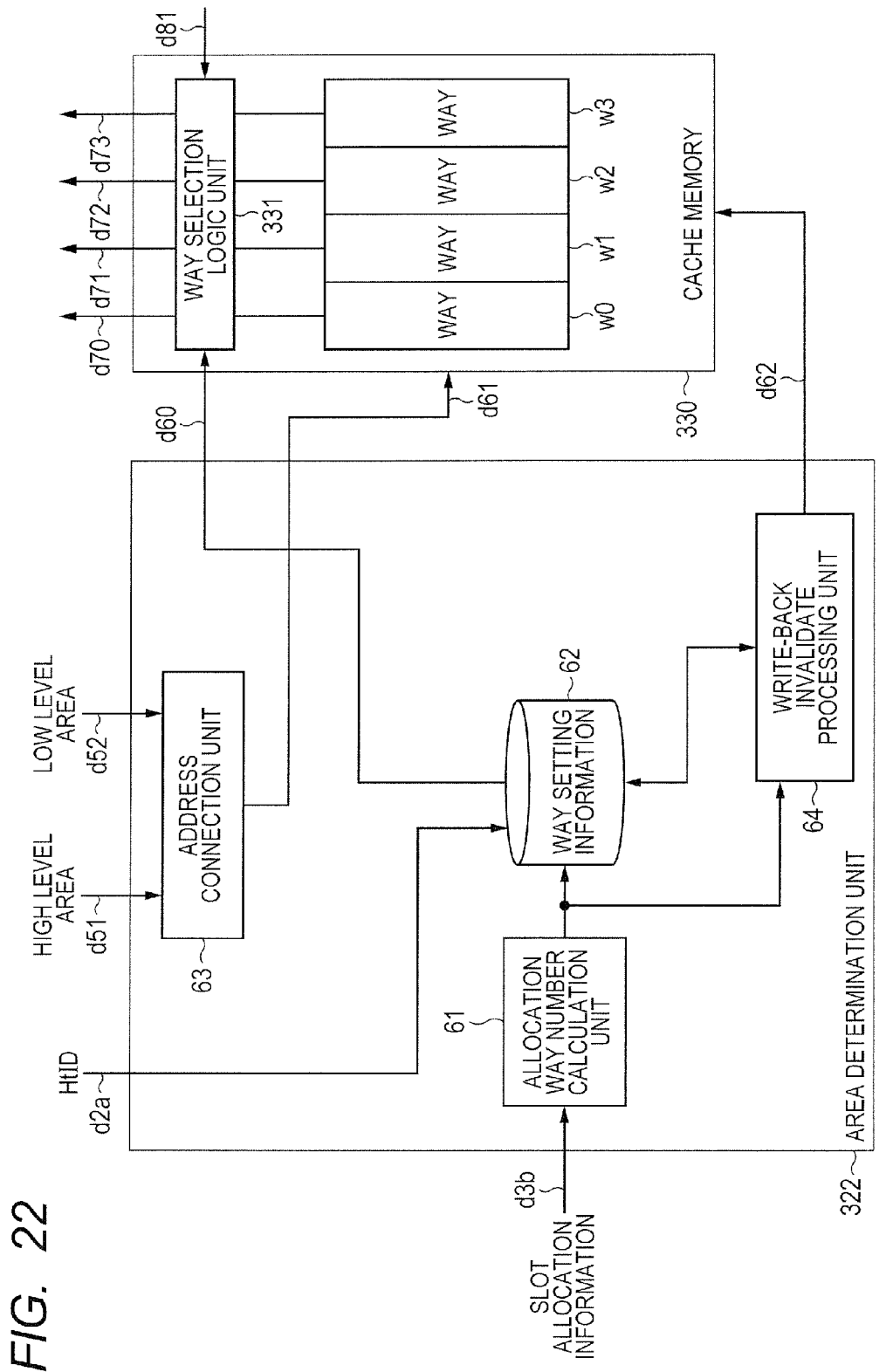
FIG. 22 is a block diagram illustrating a configuration of an area determination unit according to the fourth embodiment.
Figure 24:
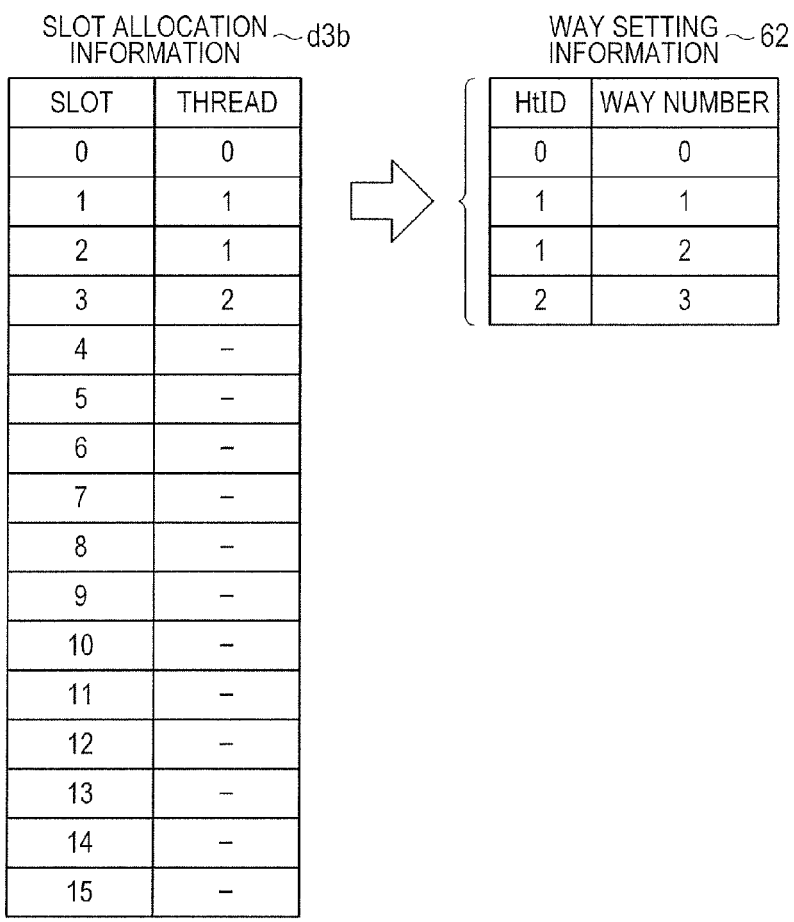
FIG. 24 is a diagram illustrating one example of data at the time of determining an area according to the fourth embodiment.

FIG. 22 is a block diagram illustrating a configuration of the area determination unit 322 according to the fourth embodiment. FIG. 24 is a diagram illustrating one example of data at the time of determining an area according to the fourth embodiment. Also, in FIG. 22, it is assumed that the number of slots is "4", the number of threads is "3", and the number of ways in a cache memory 330 is "4". For that reason, in slot allocation information d3b of FIG. 22, three threads are allocated to four slots. For example, as illustrated in FIG. 24, it is assumed that the threads "0", "1", "1", and "2" are associated with the slots 0 to 3, and the thread is not allocated to the slot 4 and the subsequent slots.

Figure 23:
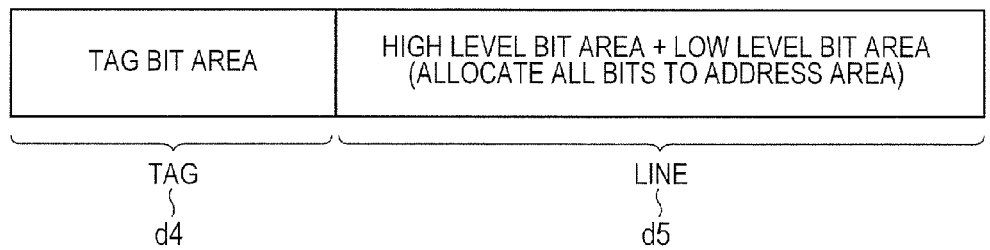
FIG. 23 is a diagram illustrating a bit configuration example of a logical address according to the fourth embodiment.

The area determination unit 322 includes an allocation way number calculation unit 61, a way setting information 62, an address connection unit 63, and a write-back invalidate processing unit 64. The allocation way number calculation unit 61 receives the slot allocation information d3b, and calculates an allocation way number allocated for each of the threads. For example, in FIG. 24, the allocation way number calculation unit 61 detects the thread numbers "0", "1", and "2" from the slot allocation information d3b. Then, the allocation way number calculation unit 61 associates the respective slots with the ways, sets the thread numbers allocated to the slots to corresponding way numbers, and stores the way numbers in an inner storage area as the way setting information 62. That is, the allocation way number calculation unit 61 determines the allocation of the way as the area. Also, the area determination unit 322 specifies the way number corresponding to the received thread ID d2a from the way setting information 62, and outputs the specified way number to a way selection logical unit 331 as the way selection signal d60. Also, the address connection unit 63 receives the upper area d51 and the lower area d52, connects those areas, and outputs the connected areas to the cache memory 330 as the line address d61. The bit configuration example of the logical address according to the fourth embodiment is illustrated in FIG. 23.

The cache memory 330 includes the way selection logical unit 331, and the ways w0 to w3. The ways w0 to w3 are irrelevant to whether the bank is present or not. The way selection logical unit 331 selects the way to be read on the basis of the way selection signal d60 notified from the area determination unit 322.

In this example, the area determination unit 322 according to the fourth embodiment can be expressed as follows. That is, the area determination unit 322 associates each of a plurality of time slots included in the slot allocation information d3b of the execution time with any one of the plurality of ways within the cache memory 330, and specifies the way associated with the time slots as the area of the cache memory to be allocated to the thread associated with the appropriate time slot. As a result, as compared with the second and third embodiments, a circuit scale of the area determination unit 322 can be suppressed. Also, as compared with the second and third embodiments, because the area is allocated by a simple method, a load of the area determining process can be reduced. In addition, the same advantages as those in the second and third embodiments can be obtained.

Subsequently, a case in which the allocation ratio of the slot in the thread is changed in the fourth embodiment will be described. The write-back invalidate processing unit 64 in FIG. 22 writes back the data of the designated way to the main memory, and invalidates the appropriated way.

Figure 25:
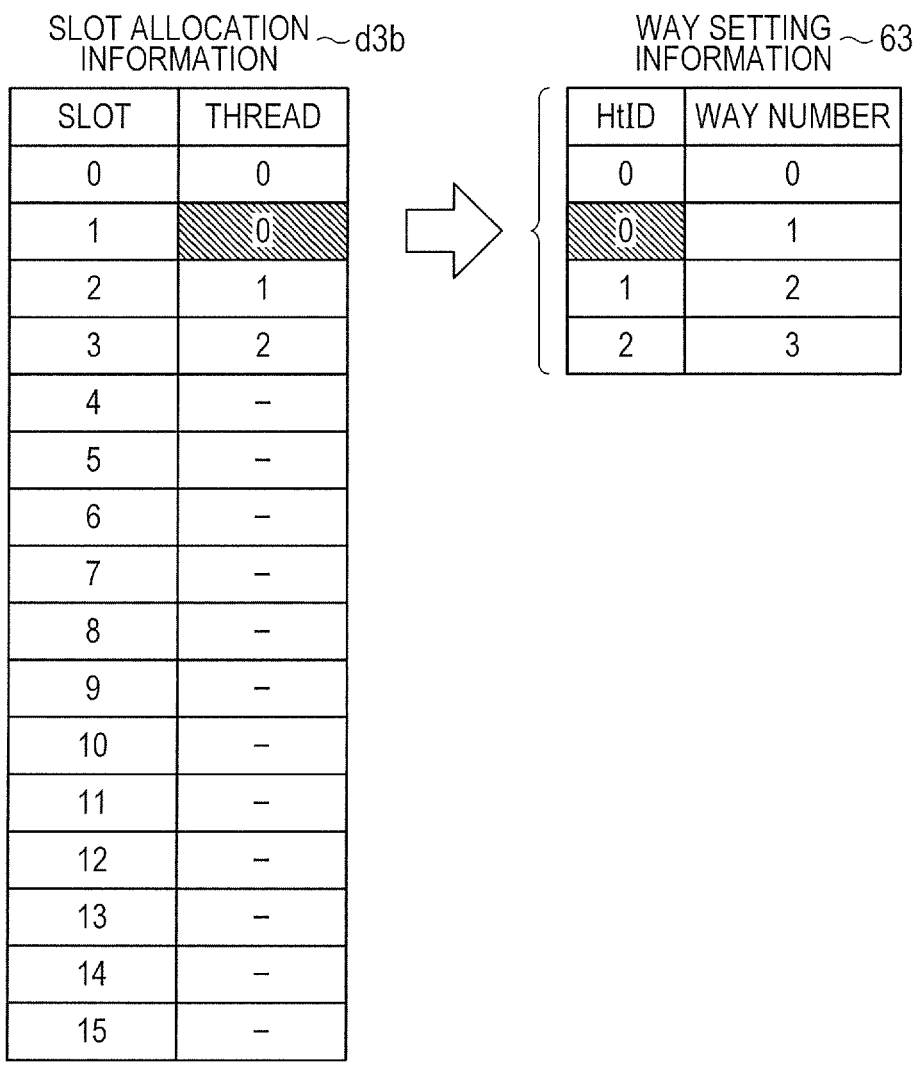
FIG. 25 is a diagram illustrating one example of data at the time of updating the area according to the fourth embodiment.

FIG. 25 is a diagram illustrating one example of data at the time of updating the area according to the fourth embodiment. FIG. 25 illustrates a case in which the thread 1 allocated to the slot 1 is changed to the thread 0. In this case, the thread scheduler 212 updates the slot allocation information d3b. Then, the area determination unit 322 receives the changed slot allocation information d3b. Also, the allocation way number calculation unit 61 specifies the slot whose allocation has been changed. In this example, the slot number "1" is specified to be changed from the thread "1" to the thread "0".

Subsequently, the allocation way number calculation unit 61 updates the thread ID set to the way number corresponding to the changed slot. That is, the allocation way number calculation unit 61 updates the way setting information 62. Specifically, the allocation way number calculation unit 61 updates the thread number of the way number "1" from "1" to "0" (FIG. 25). Then, the allocation way number calculation unit 61 notifies the write-back invalidate processing unit 64 of the updated way number. Thereafter, the write-back invalidate processing unit 64 write-back invalidates the notified way number. In this example, the way w1 is targeted.

In this way, in the fourth embodiment, as in the second and third embodiments, even if the allocation ratio of the slot in the thread is dynamically changed, the balance between the ratio of the processing speed and the allocation ratio of the area can be maintained, that is, synchronized. Hence, the usability of the overall cache memory can be improved.

Fifth Embodiment

A fifth embodiment illustrates a specific example of the above-mentioned first embodiment. The fifth embodiment is intended for a case in which a plurality of processors using the cache control device is present. The area determination unit according to the fifth embodiment is designed to determine the allocation of the area of the cache memory to be allocated to the respective instruction flows on the basis of the ratio of the processing speed among a plurality of processors to which a plurality of instruction flows is dispersed and allocated. In this example, the processing speed is an index indicative of the processing performance per unit time in the processor. The processing speed is, for example, indicative of the execution time per unit time allocated to the processor, or a clock frequency of the processor.

Also, the ratio of the processing speed may be expressed as weighting information of each of the tasks. Also, there is a case in which the respective processors are different in the frequency from each other, and the processing speed of the respective instruction flows is different depending on the allocated processor. That is, in the fifth embodiment, the ratio of the respective frequencies is dealt with as the ratio of the processing speed. That is, in the fifth embodiment, the ratio of the respective frequencies is dealt with as the ratio of the processing speed. Alternatively, it may be determined how large area of the cache memory is allocated to which processor according to the execution state of the respective processors.

Figure 26:
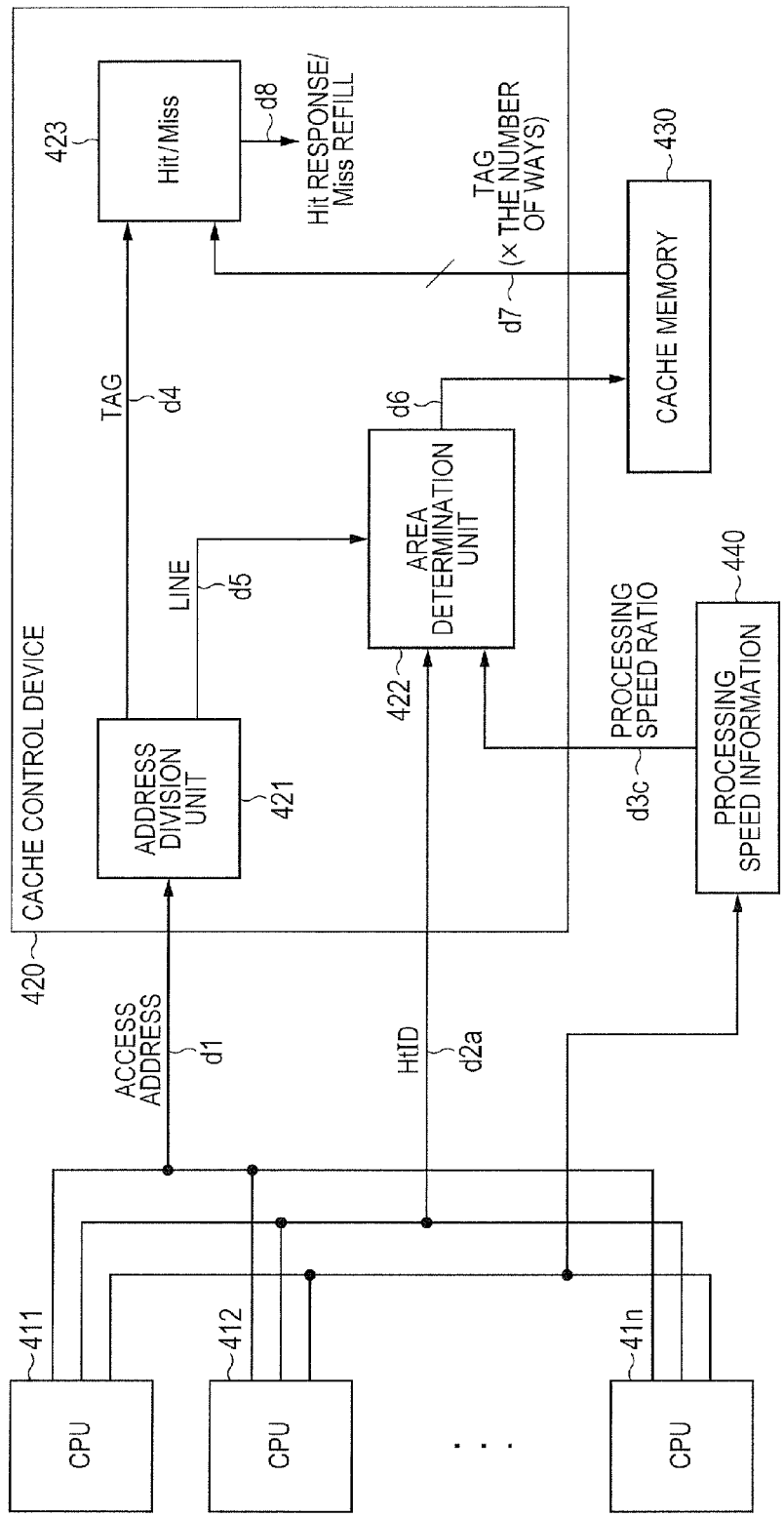
FIG. 26 is a block diagram illustrating a configuration of a computer system including a cache control device according to a fifth embodiment.

The fifth embodiment can be applied to the computer system having the multicore processor. FIG. 26 is a block diagram illustrating a configuration of the computer system including the cache control device according to the fifth embodiment. FIG. 26 typically illustrates CPUs 411, 412, . . . 41n, a cache control device 420, a cache memory 430, and processing speed information 440 in the computer system. In this example, it is assumed that the CPUs 411, 412, . . . 41n and the cache control device 420 are connected to the same bus.

The CPUs 411, 412, . . . 41n may be formed of the above-mentioned multithread core or the single core. Also, the CPUs 411, 412, . . . 41n notifies a register that holds the processing speed information 440 of information on the processing speed such as a self-frequency. The processing speed information 440 may be formed of the register per se, or the scheduler that allocates the instruction flows to the plurality of processors. Also, the cache memory 430 is equivalent to the above-mentioned cache memory 230.

The cache control device 420 includes an address division unit 421, an area determination unit 422, and a hit/miss determination unit 423. The address division unit 421 and the hit/miss determination unit 423 can be realized by equivalents to the address division unit 221 and the hit/miss determination unit 223 described above. The area determination unit 422 acquires a processing speed ratio d3c from the processing speed information 440, and determines the allocation of the area of the cache memory to be allocated to the respective processors on the basis of the processing speed ratio d3c. A method of allocating the area can be applied with that in the second to fourth embodiments. Also, the instruction flows are allocated to the respective processors, thereby being capable of realizing the parallel processing in the real-time control.

As a result, in the real-time processing, the actual use ratio of each instruction flow in the processor can be balanced with the use ratio of the cache memory. For that reason, the usability of the overall cache memory can be improved.

Other Embodiments

The cache control device according to the above-mentioned first to fifth embodiments is equipped with the cache memory, and can be applied to a data processing device that conducts the real-time control.

In the above-mentioned second and third embodiments, the example in which the total number of lines is an integral multiple of the total number of slots has been described. For that reason, the lines can be surely allocated to the threads in which the number of allocation slots is the minimum value "1" according to the ratio of the number of allocation slots. However, the lines within the cache memory 230 and the cache memory 230a may partially fail, and in this case, there is a need to invalidate the failed line, and exclude the invalidated line from an object to which the area is allocated. In this case, there is a possibility that the number of usable lines is not the integral multiple of the total number of slots. Also, in the above-mentioned fourth embodiment, the example in which the total number of ways matches the total number of slots has been described. This case may also suffer from the same problem.

Under the circumstances, the area determination unit may determine the area of the allocatable minimum unit in the area of the cache memory as the area of the cache memory to be allocated to at least the instruction flow to which the smallest ratio of the allocation ratio of the execution time is allocated, regardless of the ratio. For example, if the number of allocation slots of a certain thread is the minimum value "1", it is assumed that the line of the minimum unit of the area of the cache memory is always allocated to the thread.

Also, if the number of slots is larger than the number of ways, it is conceivable that the way is allocated to the thread to which only one slot is allocated, regardless of the allocation ratio of the execution time. Alternatively, only in this case, the lines within the way may be divided into a given number of groups.

With the above configuration, even if the ratio is too small, and the area cannot be allocated, the minimum area is allocated so that the cache hit ratio of a certain degree can be realized, and a termination time within a given time can be ensured. That is, the area of one unit at the minimum is ensured for the thread in which the allocation ratio of the processing speed in the processor is the minimum.

Further, it is desirable that the area determination unit is equipped with a check mechanism for a failure of the line in the cache memory, and the allocation of the area except for the failed line in the cache memory is determined. With this configuration, the cache hit ratio can be improved.

Also, from the above fact, the total number of lines is not limited to the integral multiple of the total number of slots. Also, the minimum unit of the area of the cache memory to be allocated to the thread is set as the line unit. However, the present invention is not limited to this configuration. For example, the plurality of lines may be set as the minimum unit of the area.

In a set associative cache, both of the ways and the indexes may be intended to set the area. For example, the number of usable ways may be set according to the priority setting of the hardware thread. Alternatively, the index may be divided and allocated.

As another embodiment, there is a microcomputer including a processor that processes a plurality of tasks, a cache, a device that controls weighting information allocated to the task, and a device that controls the cache memory on the basis of the weighting information of the task.

The first embodiment can be applied to a case in which one cache memory is shared by the plurality of threads and the CPU. FIG. 1 illustrates an example in which the CPU is one so-called single core. However, the CPU may be a multicore. In this case, the respective instruction flows are allocated to the respective cores, and executed to conduct the parallel processing. Then, the area determination unit 122 can be realized by determining the area according to the ratio of the frequency in the core. Then, the area determination unit 122 can also deal with a case in which the operating clock frequency of only some of the cores is changed.

Also, the execution time allocation unit 112 does not need to use the scheduler disclosed in Japanese Unexamined Patent Application Publication No. 2010-86128, and may define the weighting of the respective tasks in the processor. The weighting may be dynamically changed by addition or deletion of the task.

The invention made by the present inventors has been specifically described above on the basis of the embodiments. However, the present invention is not limited to the above embodiment, and can be variously changed without departing from the spirit of the invention.

What is claimed is:

1. A cache control device, comprising:
   an area determination unit comprising:
      a processing unit that determines an area of a cache memory which is allocated to each instruction flow on the basis of an allocation ratio of an execution time per unit time, for each of a plurality of the instruction flows by a processor, and generates area allocation information based on the determined area; and
      an allocation control unit that conducts a cache access based on the area allocation information,
   wherein the allocation ratio comprises slot allocation information defining a correspondence relationship between a plurality of time slots within the processor and the plurality of instruction flows,
   wherein the plurality of instruction flows includes a first instruction flow and a second instruction flow,
   wherein when a number of time slots allocated to the first instruction flow is larger than a number of time slots allocated to the second instruction flow, an area of the cache memory allocated to the first instruction flow is larger than an area of the cache memory allocated to the second instruction flow,
   wherein each of the plurality of instruction flows is allocated one or more time slots, wherein the cache memory includes a plurality of lines, each of which has an index value, and wherein the area determination unit uses slot number information of the time slots as the index value.

2. The cache control device according to claim 1, wherein the area determination unit specifies the area of the cache memory which is allocated to each instruction flow on the basis of the allocation ratio of the execution time, the area allocation information associating the specified area with the instruction flow, and wherein the area determination unit stores the area allocation information in a storage area.

3. The cache control device according to claim 2, wherein the area determination unit specifies the area of the cache memory allocated to each of the instruction flows on the basis of the time slots included in the allocation information of the execution time.

4. The cache control device according to claim 3, wherein the area determination unit tallies the time slots included in the allocation information of the execution time for each of the instruction flows to calculate the number of allocation slots in each of the instruction flows, and specifies a line within the cache memory, which is allocated to each of the instruction flows according to the ratio of the number of allocation slots.

5. The cache control device according to claim 4, wherein the area determination unit determines the area of the cache memory to be accessed on the basis of the identification information of the instruction flows included in the access request to the cache memory, and the number of allocation slots.

6. The cache control device according to claim 1, wherein when the allocation ratio of the execution time is changed, the area determination unit updates the area of the cache memory which is allocated to the instruction flows based on the change according to the allocation ratio of the execution time after changing.

7. The cache control device according to claim 6, wherein the area determination unit nullifies the area of the cache memory which has already been allocated to the instruction flows whose allocation ratio of the execution time has been reduced by the change, by an amount as large as the reduction of the allocation ratio, together with the updating.

8. The cache control device according to claim 3, wherein the area determination unit associates each of the time slots included in the allocation information of the execution time with any one of a plurality of ways within the cache memory, and specifies the way associated with the time slot as the area of the cache memory which is allocated to the instruction flow associated with the time slot.

9. The cache control device according to claim 1, wherein the area determination unit determines an area of an allocatable smallest unit in the area of the cache memory as the area of the cache memory to be allocated to at least an instruction flow to which the smallest ratio of the allocation ratios of the execution time is allocated, regardless of the allocation ratio.

10. A cache control device, comprising:

an area determination unit comprising:

a processing unit that determines an area of a cache memory which is allocated to each of a plurality of instruction flows on the basis of a ratio of a processing speed among a plurality of processors to which the instruction flows are dispersedly allocated, and generates area allocation information based on the determined area; and an allocation control unit that conducts a cache access based on the area allocation information, wherein the plurality of processors includes processors having processing speeds which are different from each other, wherein the cache memory is shared by the processors, and wherein the area determination unit determines the area of the cache memory with a ratio of the respective frequencies in the plurality of processors as the ratio of the processing speed.

11. A cache control method, comprising:

receiving by a cache control device an allocation ratio of an execution time per unit time, for a plurality of instruction flows by a processor;

determining by the cache control device an area of a cache memory which is allocated to each instruction flow on the basis of the allocation ratio of the execution time;

generating by the cache control device area allocation information based on the determined area; and conducting by the cache control device a cache access based on the area allocation information;

wherein the allocation ratio comprises slot allocation information defining a correspondence relationship between a plurality of time slots within the processor and the plurality of instruction flows, wherein the plurality of instruction flows includes a first instruction flow and a second instruction flow, and wherein when a number of time slots allocated to the first instruction flow is larger than a number of time slots allocated to the second instruction flow, an area of the cache memory allocated to the first instruction flow is larger than an area of the cache memory allocated to the second instruction flow.

12. The cache control method according to claim 11, wherein the area of the cache memory which is allocated to each instruction flow is specified on the basis of the allocation ratio of the execution time, wherein the area allocation information associates the specified area with the instruction flow, and wherein the area allocation information is stored in a storage area.

13. The cache control method according to claim 12, wherein the area of the cache memory allocated to each of the instruction flows is specified on the basis of the time slots included in the allocation information of the execution time.

14. The cache control method according to claim 13, wherein the time slots included in the allocation information of the execution time are tallied for each of the instruction flows to calculate the number of allocation slots in each of the instruction flows, and wherein a line within the cache memory, which is allocated to each of the instruction flows is specified according to the ratio of the number of allocation slots.

15. The cache control method according to claim 14, wherein an access request to the cache memory is received, and wherein the area of the cache memory to be accessed is determined on the basis of the identification information of the instruction flows included in the access request to the cache memory, and the number of allocation slots.

16. The cache control device according to claim 11, wherein when the allocation ratio of the execution time is changed, the area determination unit updates the area of the cache memory which is allocated to the instruction flows based on the change according to the allocation ratio of the execution time after changing.

17. The cache control method according to claim 16, wherein the area of the cache memory which has already been allocated to the instruction flow whose allocation ratio of the execution time has been reduced by the change, is nullified by an amount as large as the reduction of the allocation ratio, together with the updating.

18. The cache control method according to claim 13, wherein each of the time slots included in the allocation information of the execution time is associated with any one of a plurality of ways within the cache memory, and
  wherein the way associated with the time slot is specified as the area of the cache memory which is allocated to the instruction flow associated with the time slot.

19. The cache control method according to claim 11, wherein an area of an allocatable smallest unit in the area of the cache memory is determined as the area of the cache memory to be allocated to at least an instruction flow to which the smallest ratio of the allocation ratios of the execution time is allocated, regardless of the allocation ratio.

20. The cache control device according to claim 1, wherein the processing unit determines the area of the cache memory after the processor transmits the allocation ratio of the execution time to the processing unit.

21. The cache control device according to claim 5, wherein an access address in the processor is divided into at least a tag and a line, and the allocation control unit conducts cache access based on the area allocation information, according to the identification information of the instruction flows and the line.

22. The cache control device according to claim 1, wherein the cache memory includes a plurality of lines, each of which has an index value, and
  wherein the processing unit uses slot number information of the time slots as the index value.

23. The cache control method according to claim 11, wherein the cache memory includes a plurality of lines, each of which has an index value, and
  wherein the cache control device uses slot number information of the time slots as the index value.

* * * * *